United States Patent [19]
Rodgers et al.

[11] Patent Number: 5,225,637
[45] Date of Patent: Jul. 6, 1993

[54] POSITION RESOLVING SYSTEM

[75] Inventors: James L. Rodgers, Mesa; Donald F. Gray; Billy C. Fowler, both of Phoenix, all of Ariz.

[73] Assignee: Kurta Corporation, Phoenix, Ariz.

[21] Appl. No.: 769,447

[22] Filed: Oct. 1, 1991

[51] Int. Cl.$^5$ .............................................. G08C 21/00
[52] U.S. Cl. ........................................ 178/19; 178/18
[58] Field of Search .......................... 178/19, 18, 20; 340/706

[56] References Cited

U.S. PATENT DOCUMENTS

| | | | |
|---|---|---|---|
| 4,289,927 | 9/1981 | Rodgers | 178/19 |
| 4,661,656 | 4/1987 | Rodgers et al. | 178/18 |
| 4,672,154 | 6/1987 | Rodgers et al. | 118/119 |
| 4,711,977 | 12/1987 | Miyamori et al. | 178/18 |
| 4,748,295 | 5/1988 | Rodgers | 178/119 |
| 4,786,765 | 11/1988 | Yamanami et al. | 178/19 |
| 4,848,496 | 7/1989 | Murakami et al. | 178/19 |
| 4,859,814 | 8/1989 | Sciacero et al. | 178/19 |
| 4,878,553 | 11/1989 | Yamanami et al. | 178/18 |
| 4,902,858 | 2/1990 | Yamanami et al. | 178/19 |
| 4,939,318 | 2/1990 | Watson et al. | 178/19 |
| 4,948,926 | 8/1990 | Murakami et al. | 178/19 |
| 4,956,526 | 9/1990 | Murakami et al. | 178/18 |
| 4,988,837 | 1/1991 | Murakami et al. | 178/18 |
| 4,996,393 | 2/1991 | Zalenski et al. | 178/19 |
| 4,999,461 | 3/1991 | Murakami et al. | 178/19 |
| 5,073,685 | 12/1991 | Kobayashi et al. | 178/19 |

Primary Examiner—Stafford Schreyer
Attorney, Agent, or Firm—Cahill, Sutton & Thomas

[57] ABSTRACT

A position resolving system is described incorporating a cordless pointing instrument such as a pen having an oscillator and battery supply therein. Electromagnetic radiations from the pen are directed onto a tablet grid having a plurality of grid loops therein. When the pen is in contact with the tablet, signals of maximum amplitude are radiated; when the pen is raised out of contact with the tablet, signal radiation is maintained but at a decreased amplitude for a predetermined time and then reduced to zero. Each loop is formed of parallel conductors joined at one end thereof by an end conductor; each loop is placed adjacent corresponding loops in the X and in the Y directions. The electromagnetic radiations are non-coherently amplitude detected to select the grid loop in the X direction and the grid loop in the Y direction having the maximum amplitudes thereon. When an X loop and a Y loop are detected each of which have signal amplitudes thereon that are higher than the remaining X and Y loops, and wherein the signal amplitudes are above a predetermined threshold amplitude, the system subsequently scans selected loops in the vicinity of the max loops in accordance with automatically selected routines. The routines are selected in accordance with criteria that include pen speed, signal strength and pen location. The routines may either rely upon the signal strength on a subset of three grid loops in each of the X and Y directions or a subset of four grid loops in the X and Y directions.

38 Claims, 4 Drawing Sheets

CHANGE IN REPORTED POSITION WITH PENTILT —

POSITION RESOLVING SYSTEM

FIELD OF THE INVENTION

The present invention relates to position resolving systems such as electronic tablets or digitizers particularly applicable to portable or mobile computers, and more particularly to a tablet or digitizer system utilizing a cordless pen that may be used with the LCD display of a portable or mobile computer. The system of the present invention is a tablet or digitizer connectable to a host computer, such as a portable or mobile computer, for providing position information to the host computer for the accurate location of the position of an instrument. The system provides a means for locating a pen, cursor, or mouse in relation to a reference point on a surface, and digitizes such information for a variety of uses. Such information is supplied to a host computer or host system and may be utilized in the display of the information. The system of the present invention is also applicable to positional determination useful in pen based computer control systems and is appropriate for application to pointing devices and systems incorporated in pen-based computers. The information relating to the instrument location will typically be displayed in a conventional display unit associated with a host computer; however, portable or lap-top computers utilizing LCD displays are particularly adaptable to the system of the present invention.

BACKGROUND OF THE INVENTION

As used herein, the term "instrument" refers to a pen, pointing device, mouse or cursor, the position of which on a predetermined surface is to be determined. The surface may take a variety of forms familiar to those skilled in the art; however, the present system is particularly applicable to the utilization of a glass surface on a LCD display to create what is presently referred to as electronic paper. That is, the instrument is utilized to "write" on the glass surface which presents a LCD display to the user at the glass surface upon which he or she is writing. The pen or cursor may be utilized to radiate a signal downward onto the tablet and a plurality of orthogonally positioned grid conductors and a detection system are used within the tablet to ascertain the location of the source of the signals and thus the position of the instrument. The utilization of such instruments has usually entailed the use of an electric wire connection from the instrument to the tablet or the host computer; however, cordless instruments have recently become available and provide numerous advantages. If the cordless instrument is to be a source of signals for the determination of the instrument position on the tablet, then the instrument must contain a means for directing such signals onto the tablet. One technique that has been suggested in the prior art is the generation of signals within the tablet to be directed outwardly of the tablet and intercepted and redirected by the instrument back onto the tablet. While this type of system provides for the utilization of a cordless pen or instrument, the power required to transmit the signal to the pen for its subsequent retransmission to the tablet as well as the complexity of the system are distinct disadvantages. The power requirements are particularly disadvantageous when such system is to be utilized in portable applications demanding minimum power drain. Another technique that may be employed in the utilization of a cordless instrument or pen is the provision of a source of power within the instrument itself. A significant problem that is inherent in the latter cordless instrument designs is the need for a power supply such as a battery to be carried within the instrument itself. Obviously, if the instrument is a pen, the power supply must be physically small and the system within the pen must not require more power than can reasonably be expected for a significant lifetime of the battery supply.

The present invention utilizes a self-powered cordless pen to generate an electromagnetic signal directed into the grid of the tablet. The use of a self-powered cordless pen presents many substantial advantages over the above mentioned bi-directional signal system. That is, the instrument of the present invention permits greater signal levels to be sensed in the tablet, permits unidirectional transmission and thus significantly reduces the complexity required for the positional determination of the instrument. Systems incorporating cordless pen designs for use with magnetic tablets have in the past required coherency in the detection of grid signals emanating from the pen. That is, the prior art has required a coherent reference so that the phase of the signals being sensed on the grid lines in the tablet can be detected. This coherent detection is necessary for the system to indicate the direction of the pen from a magnetic signal null, or zero condition, location. To provide this coherent signal detection, the prior art, needing a reference signal for coherent detection, has resorted to the utilization of reference clock channels or complicated schemes for the generation or regeneration of clock reference signals to provide the necessary coherency.

The present invention eliminates the need for such clock channels and instead relies exclusively upon signal magnitude; the phase of the signals radiating from the cordless pen is not detected and not required and therefore it is not sensitive to phase shift errors. The elimination of reference clock channels or reference signal channels reduces the system of the present invention to the requirement of only a single channel. The single channel system is substantially less complex and provides the substantial advantages of reduced cost, power consumption, and increased applicability to enviromments requiring low power consumption such as portable or lap top computer systems. The present invention employs a particular grid pattern and a unique processing of the information of the non-coherent amplitude detected signals on the conductors to provide information that would normally be provided by signal phase detection to indicate pen direction relative to a particular grid conductor. The system of the present invention has thus eliminated the need for synchronous demodulators and replaced such demodulation techniques with simple amplitude detection. The simplicity afforded by this system yields a less expensive but reliable and light weight tablet that consumes minimum power and is particularly adaptable to applications requiring portability and mobility.

A variety of sensing or sampling techniques are utilized in the prior art to detect the presence of a pen or instrument in the proximity of a grid line and to determine the distance from the nearest grid or conductor to the instrument. These variety of techniques are intended obviously to present a precise location of the instrument on the tablet surface; these prior art techniques are frequently very complicated and incorporate complex tablet and grid configurations. In addition to accurately depicting the position of the instrument on the tablet, it is important that this position information reliably follow any change in the position of the instrument. If the instrument moves rapidly, such as the movement of a pen during handwriting, the positional routine followed by the prior art may experience difficulty making rapid adjustments to the fast moving pen or instrument. To compensate for the requirement to follow the fast moving instrument, prior art techniques have imposed further complexities on the grid and detection system that increase cost, consume more power and decrease the quality of the position information (more "jitter"). For example, to follow a fast moving instrument, prior art techniques frequently have employed fixed or single formula routines and large line or element spacings in order to minimize the number of grid lines or elements that are scanned or addressed to resolve position and to increase the range over which each scan can resolve position. The present invention overcomes these prior art difficulties by providing both rapid coverage to accommodate fast moving instruments and accuracy routines for precision in the location of the instrument. The routines thus followed by the system of the present invention are adaptive and automatically accommodate a fast moving instrument while preserving the accuracy afforded by a slower, but more accurate, positioning routine.

When pens or instruments are radiating electromagnetic signals onto an arrangement of grid conductors, the signal pattern induced in the grid conductors disproportionally changes as the instrument approaches the edge of the tablet. This disproportionality results in an erroneous indication of pen position; however, this error may be reduced (or simply ignored) by increasing the size of the tablet and restricting the active area (that area of the tablet which may be used) to that portion of the tablet sufficiently distant from the edges of the grid. However, such prior art techniques render the use of such tablets in environments such as portable computer applications impractical since in such environments the tablet must be as small as possible and any prohibited area adjacent the edges of the tablet detracts from the available size of the tablet. The present invention utilizes a compensation technique to minimize edge error through the utilization of appropriately selecting a search routine and physically positioning grid conductors in a predetermined manner.

It is therefore an object of the present invention to provide a tablet for ascertaining the position of a radiating instrument wherein the system incorporates minimum components.

It is another object of the present invention to provide a graphic tablet system utilizing a cordless pen.

It is another object of the present invention to provide a graphic tablet system utilizing a pen for radiating electromagnetic energy onto the tablet wherein signals received by the tablet are amplitude detected only.

It is another object of the present invention to provide a single channel graphic tablet system utilizing a cordless pen.

It is still another object of the present invention to provide an improved graphic tablet system incorporating the utilization of a cordless pen and a simplified design using only a single channel and without clock reference signals.

It is another object of the present invention to provide a graphic tablet utilizing a cordless pen and non-coherent amplitude detection.

It is another object of the present invention to provide a graphic tablet incorporating a cordless pen wherein the pen down signal is generated and sensed exclusively through amplitude keying.

It is still another object of the present invention to provide a graphic tablet system utilizing decision directed routines for rapid acquisition of pen position and providing high accuracy or resolution.

It is still another object of the present invention to provide automatically implemented selective routines including routines that provide substantial linearity.

It is still another object of the present invention to provide a means for minimizing edge effects; that is, the deleterious effects caused by the proximity of the tablet edge when the pen is close thereto.

It is another object of the present invention to provide a graphic tablet system having high noise immunity.

It is still another object of the present invention to provide a graphic tablet system having very low power requirements and therefore particularly useable in portable and mobile computer applications.

It is still another object of the present invention to provide a graphic tablet system that employs decision directed routines that minimize the number of grid elements that need to be addressed.

Briefly, in accordance with the embodiment chosen for illustration, the present invention utilizes a tablet incorporating a plurality of orthogonally related grid loops, each of which is connectable to a AM detector through amplifying and bandpass stages. A single select frequency is utilized and the amplitude of the signal is compared to a predetermined threshold. The pen incorporates a current controlled oscillator radiating the single frequency and utilizes a means for generating either full power or reduced power. The signal from the pen is non-coherently detected and no clock signal is utilized.

The resulting signals on the grid loops are processed using a decision directed technique for selecting routines appropriate for the conditions at the time of signal sensing. The process of routine selection is automatic and accommodates rapid pen movement while maintaining accuracy.

BRIEF DESCRIPTION OF THE DRAWINGS

The present invention may more readily be described by reference to the accompanying drawings in which:

Referring to FIG. 1, a simplified schematic block diagram is shown indicating a tablet 10 constructed in accordance with the teachings of the present invention having X and Y grid lines 11 mounted in the tablet to receive electromagnetic radiation from a radiating instrument or pen 12 whose X and Y position is to be determined relative to the tablet. While the term "electromagnetic" is used throughout this description, it will be understood that in a more precise technical sense the system of the present invention is responsive to magnetic radiation. While the signals are generated through the utilization of an oscillating coil, the signal is nevertheless detected at a position close to the source of the signal and therefore, operates under near field theories. While it is common to utilize the term electromagnetic radiation, and while that term will be used herein, a more precise term would be magnetic radiation. It should be noted that the prior art has consistently referred to such radiation as electromagnetic; therefore, to conform with that convention, the present description will refer to the radiation as electromagnetic. Multiplexing line selectors 13 are mounted on the tablet for selectively connecting predetermined ones of the grid conductors to a grid selection and signal detection system 14. The grid of the present invention incorporates a plurality of X and Y grid lines arranged orthogonally as is customary in the art; however, as shown in FIG. 2, the grid lines of the present invention are formed into vertical and horizontal two sided loops, each side of which forms a grid line and which loop includes an end conductor connecting the two grid lines. For example loop 15 includes grid lines 16 and 17 connected by end conductor 18. Similarly, conductors 20 and 21 are connected by end conductor 22 to form grid loop 23. To facilitate the description of the grid system, only three grid loops 15, 23 and 25 are shown in FIG. 2, each of which is formed by two grid conductors interconnected by an end conductor. In the embodiment chosen for illustration the grid loops are single ended having one end thereof grounded and the opposite end applied to a terminal for access by the system during operation. It will be understood by those skilled in the art that the grid loops may utilize double ended techniques to provide a double ended input for amplification. When using double ended techniques, the center of the loop may or may not be grounded; however, grounding the center of the loop reduces undesired electrostatic pickup.

Figure 2:
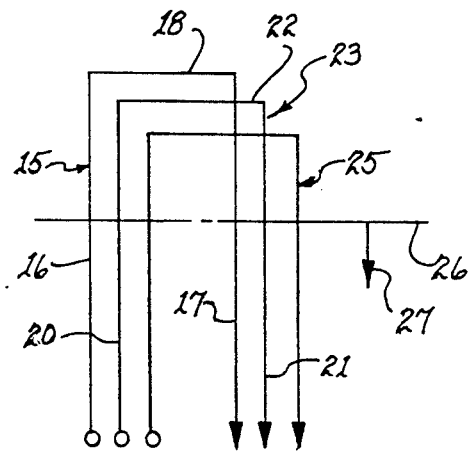
FIG. 2 is a simplified schematic representation of grid loops, useful in the explanation of the operation of the system of the present invention.

An electromagnetic signal emanating from an instrument such as a pen will present a maximum signal to the loop when positioned midway between the loop sides. As the point of the instrument moves from this loop midpoint, the signal present on the grid loop decreases. Successive grid loops are overlapped as shown in FIG. 2 and are spaced apart and have a loop width to optimize electromagnetic signal reception and the determination of instrument position. Each loop is shown comprising a single turn; it will be recognized that each loop may have several turns. The particular spacing of, and the width of, the grid loops and grid conductors will depend on numerous factors, including the overall size of the tablet, the distance the plane of the grid is from the pen or pointing device, the accuracy and tilt performance that is desired of the tablet, the number of loop selection multiplexers allowed by the system capacity, and the routines used for position estimation.

Grid loop size and spacing is also determined in relation to the coil diameter of the instrument or pen and the operating height of the coil over the grid. Specific pen coil size and the spacing of grid loops as well as grid width is chosen to obtain as much gain as possible while maintaining linearity in sensed data. In the embodiment chosen for illustration, and utilizing an operating frequency of 455 Khz, a grid conductor spacing of 0.26 inches has been chosen while a loop width of 0.91 inches has been chosen. The choice of the above frequency provides the advantage that it is below the AM band while being higher than display monitor frequencies or other common noise source frequencies.

Figure 3:
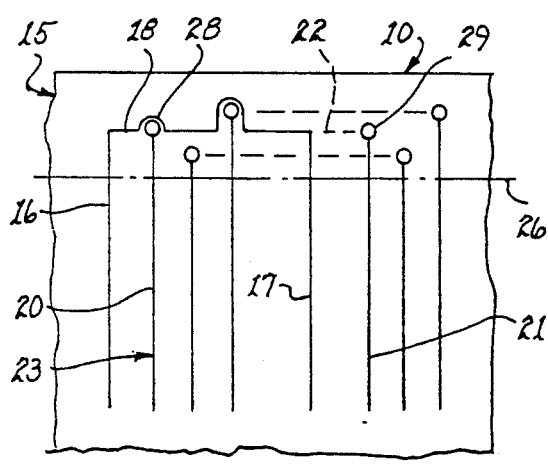
FIG. 3 is a simplified schematic representation of grid loops positioned in accordance with the teachings of the present invention.

The electromagnetic signal from the pen or instrument will induce corresponding signals in the respective grid loops as described; however, if the instrument approaches the edge of the tablet, it may be seen in FIG. 2 that the end conductors are also responsible for contributing to part of the signal in each loop. Since these end conductors are not equidistant from the instrument, the signal strength appearing on the respective grid loops will vary in a manner not predictably related to the instrument or pen position. This "edge effect" is sometimes minimized in the prior art by limiting the active area, or area of use, of the tablet to prevent the instrument or pen from approaching the physical edge of the tablet grid network. Thus, the active area boundary 26 as shown in FIG. 2 could be moved in the direction of arrow 27 to ensure that the pen or instrument remains sufficiently distant from the end conductors to minimize such edge effects. Of course, reducing the available active area in this manner means that the tablet would have to be made larger to accommodate an active of a given desired size. The system of the present invention minimizes such edge effects by strategic placement of the grid loop ends as shown in FIG. 3. In addition to the strategic placement of the grid loop ends, the utilization in the present invention of independent grid elements reduces the edge effects in comparison to those prior art systems that use a continuous pattern of interconnected grid elements.

Referring to FIG. 3, the grid loop ends are arranged with respect to adjacent grid loop ends to compensate for the edge effects caused by the instrument approaching the active area boundary 26 of the tablet working or active area. The grid edge placement takes advantage of both sides of the tablet board such that the grid loop ends remain substantially equidistant from the instrument and its electromagnetic radiation as the instrument approaches the edge of the active area of the tablet. To provide this substantially equidistant positioning, selected ones of the grid loop ends are routed to the opposite surface of the grid board such that each grid loop end conductor is essentially coincident in plan view with adjacent grid loop end conductors. Thus, it may be seen that grid conductor 16 is connected to grid conductor 17 through end conductor 18 to form grid loop 15. However, conductor 20 is connected to its corresponding grid conductor 21 in the adjacent grid loop through a conductor 22 on the opposite surface of the tablet 10. That is, the conductor 20 is connected via a plated through-hole 28 to the opposite side of the tablet and thence through conductor 22 on such opposite side to another plated through-hole 29 which in turn is connected to the opposing conductor 21 of the second grid loop. Similarly, successive adjacent grid loops have their respective loop sides interconnected by end conductors that may be positioned on the opposite side of the tablet. In this manner, the distances between or among the end conductors of adjacent grid loops, when viewed from the top of the grid or tablet, is greatly minimized. Thus, the grid loop end conductors are essentially coincident in plan view with adjacent grid loop end conductors to provide substantially equidistant positioning from an instrument or pen at or near the edge of the active area of the tablet.

The minimizing of the edge effects permits the expansion of the active area of the tablet to more efficiently utilize the available surface area; this latter feature becomes very important in applications where size of the tablet is critical as in applications requiring portability (e.g. lap top computer systems).

The electromagnetic signal from the instrument or pen induces a signal in the respective grid loops in the proximity of the instrument. The present invention utilizes non-coherent detection of signal amplitude on the respective grid conductors to ascertain which grid loop provides the greatest amplitude signal. This information is then utilized in subsequent differential non-coherent detection techniques to ascertain the position of the instrument in relation to a positional reference, such as a grid conductor or loop address, on the tablet. The non-coherently detected amplitude signal present on each grid loop is compared to a threshold amplitude level to provide information relating to the proximity of the instrument to the tablet surface. The detection of a signal of sufficient amplitude provides information to the system indicating that the system may now proceed with a selected method or routine to positionally locate the loop having the maximum signal amplitude thereon.

The instrument or pen utilized in the present system will be described more completely hereinafter; however, the pen is battery operated and contains a current controlled oscillator for producing directed electromagnetic radiation into the tablet surface. The pen has an on and an off condition as well as a pen up and a pen down condition. When the pen is on, but not in contact with the tablet surface, the amplitude of the electromagnetic signal is reduced; when the pen makes contact with the surface of the tablet a pen down switch is actuated to increase the output of the oscillator to maximum. In this manner, power is conserved when the pen is not actually in contact with the tablet while the system is nevertheless alerted. Further, the positioning system and its components may begin operating in contemplation of actual contact of the instrument or pen with the tablet surface. Such anticipatory operation minimizes delays in the determination of pen position and also assists in the processing of the position information when a pen is moved rapidly over the tablet surface and may actually and inadvertently be raised during the transition (in those instances when the pen instrument is being moved rapidly such as by a swift stroke). When the detected amplitudes on any X and any Y conductor exceed the predetermined minimum threshold amplitude, the sampling of the grid loops is undertaken; the result of the sampling is a digital address of the instrument position.

Figure 4:
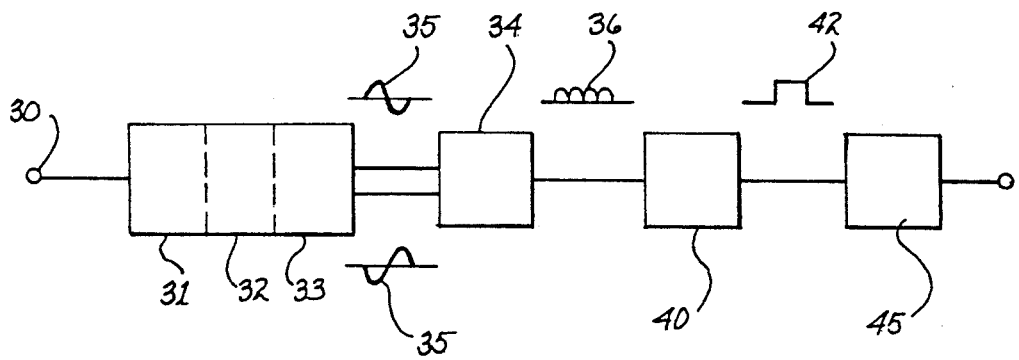
FIG. 4 is a functional block diagram useful in the description of operations performed on the amplitude signal derived from the grid loops of the tablet.

Referring now to FIG. 4, a functional block diagram is shown tracing the operations performed on the amplitude signal derived from a selected grid loop. The signal is applied to terminal 30 and fed through a series of gain and bandpass filter stages 31, 32 and 33. The signal is thus amplified and frequency components outside the selected bandpass are blocked. The individual gain and bandpass filter stages may be of conventional design; however, stability and low power consumption are very important. In a portable application, consideration should be given to the implementation of a circuit that has a gain that is insensitive to battery voltage variations and that has a high gain-frequency product versus power relationship to conserve power. For these reasons, discrete transistor video-type circuits are preferred over operational amplifier integrated circuits. The system of the present invention uses conventional discrete operational amplifiers. The final stage is provided with a differential output to be supplied to a low threshold, low offset, linear AM detector 34. This AM detector is a full wave detector for improved signal-to-noise ratio. As used herein, the term "non-coherent amplitude detection" means the detection of relevant signals without regard to the phase of such signals. That is, phase information is irrelevant and non-coherent amplitude detection specifically excludes the consideration of any phase information that may be present in the signal. Sample schematic output waveforms from the gain and bandpass filter stages are shown at 35 as applied to the detector. The AM detector 34 produces a full wave rectified signal as shown at 36, the mean value of which is representative of the signal amplitude on the selected grid loop. A DC-to-pulse-width converter 40 yields a gated pulse width signal 42 that is converted in a pulse width analog-to-digital converter 45 to convert the signal into digital format for application to a microprocessor for further handling as will be described more fully hereinafter. The pulse width converter 40 and analog-to-digital converter 45 may also take a variety of forms, all of which are well known in the art. A conventional dual slope implementation of an analog-to-digital converter may be used in the converting of the signal shown at 36 into digital format. It has been found desirable to align the entire system by reading a predetermined test signal having desired amplitude or amplitudes; in this manner, the system is appropriately calibrated for the reception of grid loop amplitude signals when received in normal operation.

The signal operations circuits of the functional blocks of FIG. 4 are of conventional design and may take any of several well known forms. However, it is important to recognize that the entire signal handling technique has occurred without coherent detection and with reliance upon only amplitude of the sensed signals on the grid loops.

Figure 1:
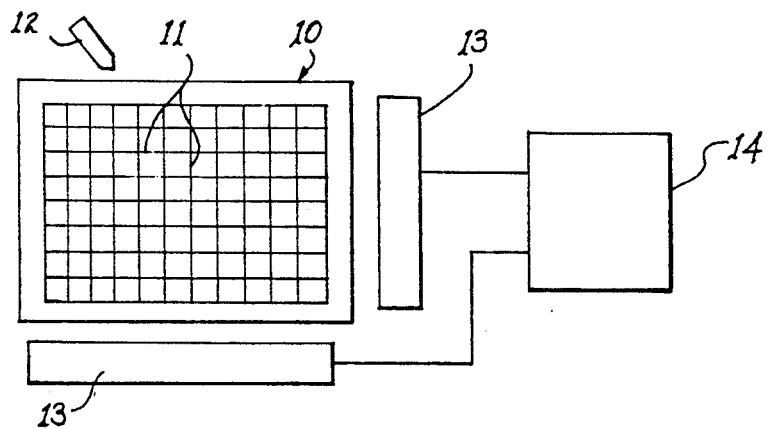
FIG. 1 is a simplified block diagram of a graphic tablet system incorporating the teachings of the present invention.
Figure 5:
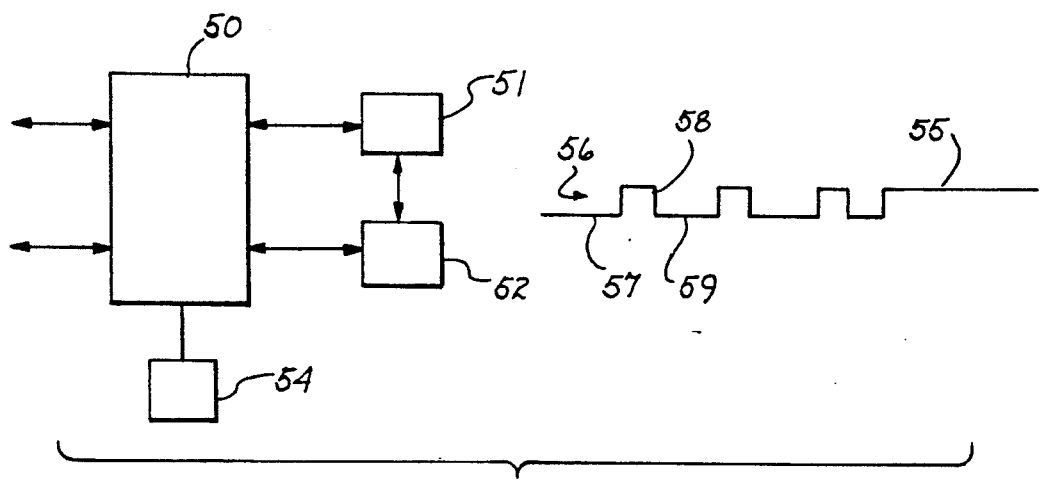
FIG. 5 is a schematic block diagram showing the control processor and associated functional elements.

Referring now to FIG. 5, the digitized signal representing sensed signal amplitude on the selected grid loop is applied to a microcontroller or microprocessor 50. The microprocessor is a commercially available microprocessor that has been selected for high power efficiency using low power CMOS technology that will maintain its present status at zero clock frequency. The processor chosen incorporates an internal eight bit counter to read part of the twelve bit digital input, the higher bits being read with an external counter. The latter technique being used to keep the input to the internal serial counter under 1 Mhz input capability. The processor provides control output to select the respective multiplexer lines for addressing selected grid loops in accordance with any one of the selected routines incorporated in the present system. It has been found that commercially available microprocessors such as a NEC 78C10 are satisfactory choices for use in the system of the present invention. The microcontroller or microprocessor 50 is connected to grid selecting multiplexers 13 of FIG. 1 for selectively gating the grid loops of the tablet to the input of the gain and bandpass filter stages of FIG. 4. The digitized amplitude resulting from the selection of a grid loop supplied to the microprocessor completes one step of a selected routine as will be described herein. The program for operating the tablet is stored in CMOS EPROM 52 while address latch 12 demultiplexes the microcontroller bus in order to address the EPROM. Of course, these parts are not needed when the internal ROM of the microcontroller contains the operational program. The system is coupled to a host computer through a conventional RS232 coupling 53 which supplies power to the system and receives and transmits information to and from the host system in a conventional manner.

In those environments where the host system may itself be battery powered, such as portable or lap top computers, it is important that the system conserve power. Thus, the system includes a CMOS timer 54 connected to the microprocessor; the timer periodically "activates" the microprocessor system to have the latter briefly scan the grid loops to observe whether the pen or pointing device is radiating an electromagnetic signal and if so, whether the pen is near enough to the surface of the tablet for the tablet to acquire, track and then resolve the position of the pointing device. If the pen or pointing device is not sufficiently close to the surface of the tablet, or if no signal is being radiated by the pen, then the microprocessor restarts the timer and goes into a "sleep" mode where it is consuming a very minimal amount of power. Due to the low percentage of the time that the microprocessor is active in this sleep/activate cycle, the average power consumed over this cycle remains very low. Of course, if the host computer system is off, the processor and the system of the present invention remain off. The waveform 56 is illustrative of this timing sequence. The portion 57 of the waveform indicates the "off" or "sleep" condition of the processor. At 58 the processor is turned on to permit the system to seek a suitable pen proximity signal; failing the detection of such signal, the system is shut off and returns to the sleep mode 59. As long as the host system is on, the processor will continue to cycle between the seek and sleep modes. Upon detection of a pen proximity signal, the system will switch on and remain on as shown at 55 until commanded to return to the sleep/seek modes. Thus, the timer insures that the microprocessor operates only a short period of time unless the presence of an appropriate amplitude pen signal is detected, digitized, and provided to the microprocessor. The application of such pen signal to the microprocessor insures that the processor remains on independently of the timer.

Figure 6:
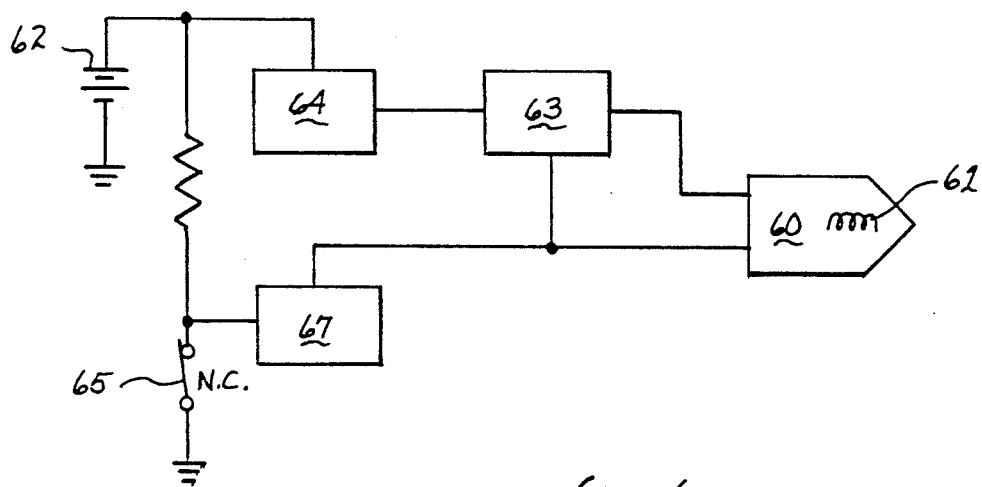
FIG. 6 is a functional block diagram of a cordless instrument or pen for use in the system of the present invention.

Referring now to FIG. 6, the cordless pen or pointing device utilized in the system of the present invention is shown in functional block diagram form. The pen is described in more detail in copending application Ser. No. 07/771,369 filed Oct. 1, 1991 and assigned to the Assignee of the present invention, which application is hereby incorporated herein. The pen includes a current controlled oscillator 60 that supplies a radiating oscillator coil 61 to emit electromagnetic radiation at a single frequency. A power supply, such as battery 62, is connected to the oscillator through a power on/off flip-flop circuit 63; a timer 64 is connected to the power source 62 and to the flip-flop 63. Battery voltage is also applied through the operation of a normally closed switch 65 to a Schmitt trigger 67, the output of which is connected to the flip-flop 63 and the oscillator 60. The normally closed switch 65 is the pen down switch that is activated when the point of the pen contacts the surface of the tablet. In its quiescent state, the pen is entirely off and no current other than normal leakage current flows. When the normally closed switch is open, battery voltage is applied to the timer and the Schmitt trigger and the oscillator is powered to one hundred percent of its rated power output.

When in this "pen down" condition, the amplitude of the signal detected by the grid is above the threshold of the required detected signal amplitude to instigate the pen location procedure of the system. If the pen is raised from the surface of the tablet, and the switch returns to its normally closed position, the timer maintains power to the oscillator for a limited time and the oscillator continues to oscillate but at reduced power, preferably about 40% of maximum. If the pen is close to, or in proximity to, the surface of the tablet (not touching the tablet . . . e.g. 0.5 inches) the system can continue to attempt to locate the pen and if the received pen signal is sufficiently strong, the system can resolve pen position. This ability to search and locate pen position when the pen is not in a pen down position permits the locating system to "prime" itself to react more quickly and accurately when the pen is replaced on the surface of the tablet. The system is able to react more quickly and provide information concerning pen position more promptly then if the pen were to be completely shut off during this period of time. The ability of the system to operate on receipt of signals when the pen is in proximity of but not in contact with the tablet surface provides substantial advantages over a system requiring pen down signals to be received before processing begins. The latter techniques are found in conductive or pressure sensitive surface systems found in the prior art. Having position data supplied to the system input before the pen down signal is received permits the system to operate in selected routines with system filters in operation; the system including filters does not therefore need to instantly go from a zero input condition to a full data value condition at the time of pen down. That is, the filters would have to rapidly slew to their eventual data value thus creating errors in the filter output. In the present system, the filters do not see a change in data from a pre-pen down condition to a post-pen down condition so that the filtering of the data proceeds without creating errors. Thus, the pen down signal results exclusively from amplitude keying and is instantaneous; there is no necessity for waiting for a particular window of transmission time as in several prior art systems nor is there an imposed time delay for encoded messages as other prior art designs require.

When the pen is again placed against the tablet surface and the normally closed switch is opened, the amplitude of the radiated signal from the pen returns to its former high level. To prevent the increase in the pen signal from creating errors within the system, the receipt of the pen down signal caused by the increased amplitude of radiation from the pen results in the generation of a pen down status that is maintained in the system for a minimum period of time. This period of time is approximately the time required to scan selected grid loops, or one scan time, and in the embodiment chosen for illustration will be approximately six milliseconds. Thus, any pen down signal resulting from the opening of the normally closed switch within the pen creates a pen down status that is maintained for a minimum of six milliseconds. In this manner, the increased signal amplitude detected by the grid can be verified by the system as a valid pen down signal and data read during this time may be discarded as will be described later.

Figure 7:
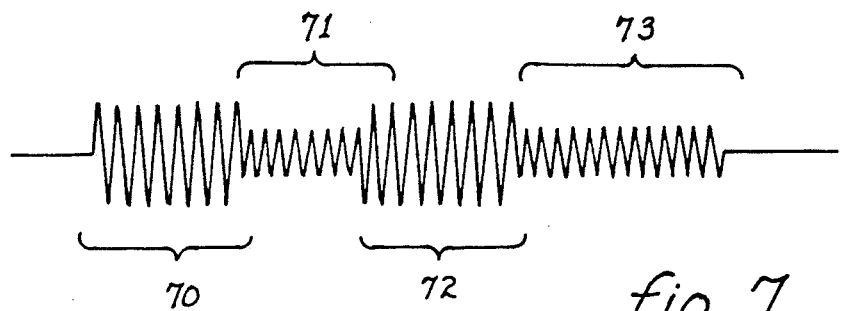
FIG. 7 is a waveform of the electromagnetic radiation emanating from the cordless pen of FIG. 6.

A representative waveform is shown in FIG. 7 relating to the radiated pen signal. When the pen is off, no signal is generated as shown at the left end of the waveform of FIG. 7. When the pen is placed against the tablet surface, and the normally closed pen down switch is opened, the pen down signal results in the one hundred percent rated radiating power output of the oscillator as shown at 70 in FIG. 7. When the pen is raised from the surface of the tablet and the normally closed pen down switch again closes, the pen oscillator is not turned off but is switched to a reduced power output as shown at 71 in FIG. 7. This reduced amplitude output of the oscillator will continue for a predetermined time and then cease as the timer switches the pen off. However, if before that predetermined time expires the pen is again lowered into contact with the tablet to open the normally closed pen down switch, the oscillator output is again raised to its one hundred percent rated output as shown at 72 in FIG. 7. Again, when the pen is raised the output of the oscillator is reduced as shown at 73 and continues for a predetermined time after which the timer causes the pen to shut off.

It should be noted that the pen down signal created by the opening of the normally closed switch 65 results in amplitude keying; that is, no other event occurs in the system to tell the system that a pen down condition exists. It should also be noted that the pen down signal created by the pen down condition does not require additional circuitry or time; the same circuitry and system used to resolve instrument position is also used to generate and indicate the pen down condition. While the amplitude keying described herein presents significant advantages, it may be possible to combine amplitude keying with a frequency shift. That is, in the case of a mouse, the amplitude could be used to indicate mouse lift-off (lower signal amplitude when lifted) in order to stop data output and a frequency shift then used to indicate or transmit the mouse button status. Thus, in the system of the present invention, the change in amplitude of the electromagnetic radiated signal is the only keying event with the result that the signal is provided instantaneously without the need for encoding or waiting for a timing window. The instantaneous increase in signal amplitude can result in an induced error in the data read during the scan of the tablet surface during which the amplitude change occurred. The data reading error thus caused should not be utilized in the determination or attempted determination of pen position and should be disregarded to prevent erroneous or ambiguous signals from affecting indicated pen position. To accommodate the effects of amplitude change during a scan in which a pen down occurs, the system of the present invention internally generates a pen down status and maintains additional scan to confirm that a pen down condition is present and to provide positional data; the data gathered during the scan that included the pen down event is ignored. This missing data is reconstructed by averaging the data of the previous or prior pen down scan to the data from the next valid scan. It is important to note that as used in this paragraph, the term "scan" does not mean the sweeping of all X and Y conductors to ascertain amplitudes thereon; rather, it is intended to mean the selective sensing of predetermined grid loops in the vicinity of the pen position as calculated in accordance with a selected routine. The system of the present invention "scans" the entire tablet only when in the acquisition mode searching for the presence of a loop amplitude above a predetermined threshold to ascertain the presence of the pen or the proximity of the pen. Once this latter sensing has been accomplished, no more scanning of the complete tablet surface is undertaken, and all subsequent "scanning" is limited to only selected loops as will be described later.

The electromagnetic radiation from the oscillator coil penetrates the grid loops on the tablet. When the pen or pointing device is in the pen down condition, and generating maximum amplitude radiation, the sensed signal in the grid will be above the predetermined threshold level and the sensed signals on the grids are processed in accordance with a selected routine. It may be noted that the pen down signal, or lack of such pen down signal, can be used for purposes other than the determination of instrument or pen position. For example, when the pen is not in contact with the surface and no pen down signal has been generated, system filtering can be selected to permit the detection of the pen signal (not pen down signal—but signal being generated by the pen before the down condition) in the presence of more noise. This latter technique could be useful if a very low power output condition were to be used with a pen to extend battery life. If it were desirable to sense the pen at greater heights or distances from the tablet surface, the filtering could be increased further with additional built-in hysteresis to reduce the positional variations with noise. Conversely, the pen down signal may be utilized to open the system filters to adapt the system for very high instrument speed.

The routine to be selected will depend on several conditions; for example, if the pen is not down but is in proximity of the tablet surface sufficient to provide detectable signal levels, a certain routine is selected. If the pen is moving rapidly over the tablet surface, or approaches to within a predetermined distance to a tablet edge, a particular routine is selected; further, if the pen is in the down condition and is moving normally, or is stopped, a further routine selection is made. As signals are induced in the grid loops, the signal amplitudes present on the respective grid loops are digitized, and processed to determine the position of the instrument or pen on the tablet. As mentioned previously, the combined requirements of speed and resolution in the determination of pen position frequently result in compromises to achieve an improvement in one at the expense of the other. To overcome these seemingly diametric requirements, great expense in the form of circuit complexity and high power requirements have been required in the prior art. To maintain the simplicity of fewer components, and thus lower power requirements, the present invention develops the digitized amplitude signals and processes them in a unique manner.

The present system first scans, in an acquisition mode, each of the X and Y loops to locate an X and a Y loop whose amplitude signals are the maximum of all X and Y loops, respectively, and whose amplitudes exceed an "in proximity" threshold. The present embodiment utilizes interleaving in its scan process; that is, a first X loop is scanned, then a first Y loop is scanned, then a second X loop is scanned, etc. In this manner, the entire tablet surface is scanned for the presence of a sensed electromagnetic signal from the pen whose digitized amplitude exceeds a predetermined threshold. While interleaving is not required, it is preferred to sequential scanning that scans all X loops and then all Y loops. The preference for interleaving is based in part on the reduction of the dynamic error that results from the utilization of sequential scanning. That is, in sequential scanning, the information or data relating to the X position of the sensed pen must be mated with corresponding positional information in the Y direction; however, since all of the X conductors must be sensed before any of the Y conductors are sensed, the Y position information may differ substantially in time of occurrence from the X position information. This time difference can be very disadvantageous if the pen is moving during this period of time such that the X and Y data are not matched in time. Such dynamic errors may frequently be seen in displays as slight curvatures in lines drawn at 45° angles across the display surface. In contrast, the time differential between the reading of the X and Y data is greatly reduced by interleaving to thereby minimize such dynamic errors.

When an amplitude signal on an X loop and an amplitude on a Y loop have both exceeded the "in proximity" threshold amplitude, the system then abandons its scanning routine in the acquisition mode and enters the tracking mode to concentrate on only that location in the immediate vicinity of the perceived pen signal. Upon entering the tracking mode the present system samples the amplitudes of a subset of X loops and Y loops that are closest to the pen position The sequence of sampling this subset is interleaved X and Y; that is, first the signal amplitude on an X loop is sampled, then a signal amplitude is sampled on a Y loop, and then another X loop is sampled, etc. The selection of the routine to be utilized in determining the sequence of the sampling will be described later. The present system will abandon the tracking mode and revert to the acquisition mode if the X and Y loop pair having the largest signal amplitudes thereon within the subset of X and Y loops no longer have signal amplitudes that both exceed the "in-proximity" threshold. Exiting the tracking mode may be the result of any of several events including the movement of the pen out of proximity with respect to the tablet, the pen being turned off as a result of lack of activity (no recent pen down event within the timing period allotted for such event), or the pen was moved across the tablet at such a rate that the subset of X and Y loops used to track the pointing device was not updated quickly enough to extract tracking information. When the system is in the tracking mode, and as long as it remains in the tracking mode, the system of the present invention concentrates on the location of the pen signal to quickly resolve the precise location or address on the tablet and to track that position as it changes through pen movement. The efficiency of the system in accomplishing this feat is predicated on the minimization of the number of loops that are sensed or read and altering the selection of loops that are used to resolve the pen position depending on pen speed (rate of change of pen position) and, when the pen approaches the edge of the tablet, upon pen position.

When the presence of the pen is sensed through the above interleaved scan, the subsequent process for determining and maintaining positional information regarding the pen no longer requires "scanning" as used in the prior art wherein all grid conductors are sensed; rather, pen position is determined by decision directed routines that sense signal amplitudes on selected grid loops within an subset of loops.

The implementation of the selected routines enables the system of the present invention to accurately resolve pen position in accordance with a routine that is adapted to the particular conditions at the time the resolution effort is undertaken. The routines concentrate on the immediate vicinity of the pen or instrument by reducing the number of loops or conductors that are "scanned" or sensed to a small number; thus, rather than continuously scanning the entire tablet surface, the routines permit the inquiry concerning pen or instrument position to be restricted to a small window of X and Y loops. The routines sample the data present on the loop having a signal with the maximum amplitude thereon and on the adjacent loops. The determination of which loops are thereafter to be sampled depends on decisions predicated on differences in signal amplitudes between selected grid loops. The routines therefore sample data, determine where additional data is to be sampled based on the relationship of the data on the sampled loops, and continue to sample data on the respective loops within this window to resolve the instrument position. The routines include one for resolving the instrument position through the sampling of data on three loops; this routine resolves the instrument position and facilitates rapid tracking of the instrument by incrementing or decrementing the address of the loop with maximum amplitude signal thereon by two. This "three loop routine" permits tracking during rapid instrument movement and may also be used to track instrument movement even though the instrument may not be in contact with the tablet but is in proximity to the surface thereof. The "three loop routine" is also chosen for resolving instrument position when the instrument approaches within a predetermined distance of the tablet edge. Since this routine requires only the sampling of three loop signal amplitudes, the routine may conveniently be used close to the edge of the tablet.

Another routine resolves instrument position by utilizing the sampled data on four selected loops. The latter routine provides a uniquely accurate resolution of instrument position and is more linear and less sensitive to tilt errors as will be described more fully hereinafter. This "four loop routine" is appropriately selected when the address or index of the loop with the maximum signal thereon is to remain the same or be incremented or decremented by no more than one. The selection of the "three loop routine" or the "four loop routine" is based upon information derived from sensed data within the above mentioned window and is automatic. A description of the method of selection of the respective routines, and a description of the routines will now be undertaken. The following description will relate only to the X direction loops, it will be understood that corresponding comments and description would equally relate to Y direction loops.

It will be understood by those skilled in the art that the physical location of each loop on the tablet may be measured from a predetermined origin. That is, a specific location on the tablet surface may be considered the origin and the physical location of a pen or instrument on the tablet can be measured from that origin to derive a digitally encoded address to be supplied to a host computer and/or display. Further, in the embodiment of the present invention chosen for illustration, the physical distances between the loop centers has been divided into 240 positions; therefore, a pen position may be determined by reference to the fixed position of the origin, the distance from the origin to the loop with the largest amplitude signal (expressed in terms of "positions"), plus (or minus) the number of "positions" from the loop with the maximum signal thereon to the pen or instrument.

When the loop with the maximum reading thereon has been determined through either a previous full scan (scan of all X and Y grid loops) while in the acquisition mode or a partial scan (scan of only selected grid loops) when in the tracking mode, then the amplitude of the signal on each of the loops on either side of the max amplitude loop are sampled and a difference between these amplitudes is formed. Depending on whether the difference is greater or less than zero, the second loop removed from the loop with maximum amplitude on a selected side is sampled to form a difference between that amplitude and the amplitude of the loop adjacent to but on the opposite side of the loop with maximum amplitude. Again, depending on whether the latter difference is greater or less than zero, the system samples either the amplitude on a selected third loop removed from the loop with maximum amplitude or the amplitude of the unsampled second loop removed from the maximum loop. If the amplitude that is selected to be sampled is the amplitude on the third loop removed from the loop with maximum amplitude, then a decision is formed to change the index (address) of the loop with the maximum amplitude by either one or two positions. The determination of whether to change the indicated position of the pen one or two positions is a decision based upon using either four selected loop amplitudes or three selected loop amplitudes as will be explained more fully hereinafter. However, if the amplitude of the signal on the previously unsampled second loop removed from the maximum amplitude loop is sampled, then the position of the instrument or pen is calculated using four selected loop amplitudes, and the indicated position of the loop with the maximum amplitude remains the same.

Figure 8:
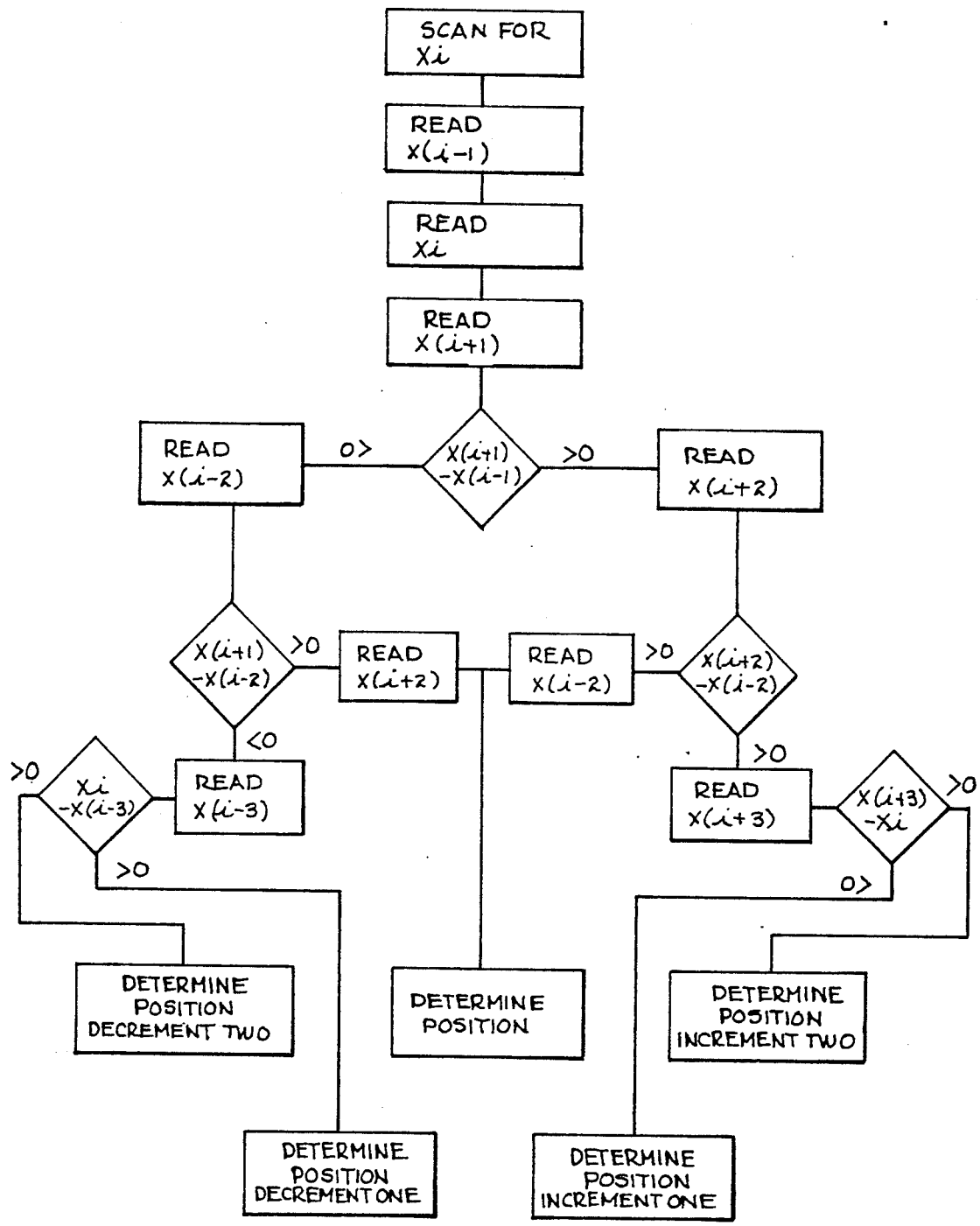
FIG. 8 is a flow chart useful in the description of operation of the system of the present invention.

This decision directed selection of routines may more readily be described by reference to the flow diagram of FIG. 8 wherein it may be seen that at the completion of a partial scan in the tracking mode, the tablet adjusts its scanning window to closer align, or track, the position of the pen or pointing device. It accomplishes this tracking function by updating the index or address of the loop with the maximum amplitude thereon, loop Xi. The system then begins a partial scan by again sampling the amplitudes of three loops about the new maximum amplitude loop address. That is, the amplitudes on loops $X(i-1)$, $Xi$, and $X(i+1)$, are sampled to form a difference $X(i+1)-X(i-1)$. Assuming, for purposes of description, that this difference is less than 0, the system then samples the second loop removed from the maximum loop on a selected side; that is, the system samples the amplitude of the signal present on loop $X(i-2)$ and then forms a difference between that amplitude and the amplitude of the signal on the loop adjacent to but on the opposite side of the loop with the maximum amplitude. That is, $X(i+1)-X(i-2)$. If the difference thus formed is greater than 0, then the system samples the amplitude of the loop $X(i+2)$ and the position of the pen is determined using the following routine:

$$P(X) = (Xi - Xo)K + 0.5K\left[\frac{AX(i+1) - AX(i-2) + AX(i+2) - AX(i-1)}{AX(i+1) - AX(i-2) - AX(i+2) + AX(i-1)}\right]$$

where:
P(X) = estimated pen position in the X direction from the origin
Xo = index, or address, of X loop centered on the chosen origin
Xi = index, or address, of X loop having maximum signal amplitude
K = constant equal to the number of "positions" between loop centers (in this example, K = 240)
AX( ) signal amplitude on the X( ) loop
and the index, or address, of the loop with the maximum amplitude signal thereon remains the same. If the last mentioned difference, that is $X(i+1)-X(i-2)$ is less than 0, the system samples the amplitude on the loop $X(i-3)$ and subsequently makes a decision in both the determination of pen position and whether or not to decrement the index or position of the pen by one or two loops. That is, if the difference $Xi-X(i-3)$ is less than 0, then the position of the pen is determined using the following routine:

$$P(X) = [X(i-2) - Xo]K + 0.5K\left[\frac{AXi - AX(i-3)}{AX(i-1) - AXi} + 1\right]$$

and the index or address of the loop with maximum amplitude signal thereon is decremented by two. If however the difference $Xi-X(i-3)$ is greater than 0, then the position of the pen is determined using the following routine:

$$P(X) = [X(i-1) - Xo]K + 0.5K\left[\frac{AXi - AX(i-3) + AX(i+1) - AX(i-2)}{AXi - AX(i-3) - AX(i+1) + AX(i-2)}\right]$$

and the index or address of the loop with the maximum amplitude signal thereon is decremented by one.

The above description of the selected routines was based upon the assumption, recited above, that the difference in amplitudes on the loops $X(i+1)-X(i-1)$ was less than 0. If, however, that difference was greater than 0, the system would then sample the second loop removed from the maximum loop on a selected side; that is, the system would sample the amplitude of the signal present on loop $X(i+2)$ and then forms a difference between that amplitude and the amplitude of the signal on the loop adjacent to but on the opposite side of the loop with the maximum amplitude. That is, $X(i+2)-X(i-1)$. If the difference thus formed is less than 0 then the system samples the amplitude of the loop $X(i-2)$ and the position of the pen is determined by using the following routine:

$$P(X) = (Xi - Xo)K +$$

-continued $$0.5K\left[\frac{AX(i+1) - AX(i-2) + AX(i+2) - AX(i-1)}{AX(i+1) - AX(i-2) - AX(i+2) + AX(i-1)}\right]$$

and the index, or address, of the loop with the maximum amplitude signal thereon remains the same. If the last mentioned difference, that is $X(i+2)-X(i-1)$ is greater than 0, the system then samples the amplitude on the loop $X(i+3)$ and subsequently makes a decision in both the determination of pen position and whether or not to increment the index or position of the pen by one or two. That is, if the difference $X(i+3)-Xi$ is greater than 0, then the pen is determined using the following routine:

$$P(X) = [(Xi + 2) + Xo]K + 0.5K\left[\frac{AX(i+3) - AXi}{AX(i+1) - AXi} - 1\right]$$

and the index or address of the loop with maximum amplitude signal thereon is incremented by two. If, however, the difference $X(i+3)-Xi$ is less than 0, then the position of the pen is determined using the following routine:

$$P(X) = [X(i+1) + Xo]K +$$

$$0.5K\left[\frac{AX(i+2) - AX(i-1) + AX(i+3) - AXi}{AX(i+2) - AX(i-1) - AX(i+3) + AXi}\right]$$

and the index or address of the loop with the maximum signal amplitude thereon is incremented by one.

The routine chosen for resolving pen position will utilize either the amplitude present on three selected loops or the amplitude present on four selected loops. The selection of a routine to resolve position through the use of four loops presents the greater accuracy; however, the routine utilizing the amplitude information from three loops permits the resolution of the position of the pen or pointing device while the latter is close to the edge of the tablet or when the pen or pointing device is moving across the tablet at a very high rate of speed (e.g.: over forty inches per second). The benefit of the decision directing scanning described here is that it automatically and dynamically selects the position resolving routine that is best for the given operating conditions at the moment.

As mentioned previously in connection with the description of the pen signal, the signal strength transmitted by the pen will either be 100% available radiated power (pen down condition) or reduced radiated power (pen up position). Also as previously described, when the pen is on but is not in contact with the tablet, the tablet will nevertheless sense the pen if it is sufficiently close to the tablet surface (in proximity—approximately 0.5 inches). The tablet will also track and resolve the position of the pointing device or pen even though the device is not in contact with the tablet. In this manner, the system is "primed" and is tracking the pen using its fastest pen speed routine until a pen down condition occurs.

Since the more accurate position resolving routine requires the sensing of the amplitude on four selected grid loops, the routine may be incapable of accurate pen position resolving near the grid edge since there may be insufficient grid loops to select four grid loops for the routine. Thus, when the pen position is within a predetermined distance from the edge of the active area of the tablet, this system limits the selection of routines to the routine requiring only the sensing of signal amplitude on three selected grid loops.

It may be seen by the above description that the decision concerning choice of precise routine used in resolving the position of the pen, is controlled by the immediate conditions of pen speed, pen signal (pen down, pen up in proximity) and the pen position (i.e., when the pen is near the tablet edge). The decisions concerning the routine specifically followed in any particular instance are made simultaneously with pen operation; that is, the decisions are made automatically and instantaneously during operation. In other words, if the pen is stationary, the decision to select the appropriate routine is made and the position of that stationary pen is promptly and accurately resolved by reference to the signal amplitude on four selected grid loops. If the pen is moved, the position is resolved by a different routine by reference to the signal amplitude on a different four selected grid loops that, while it presents the same positional accuracy or resolution as in the case of the stationary pen, nevertheless will change the index or address of the loop with the maximum amplitude by one. In the event the pen is moved rapidly, such as when a stroke across the tablet is made with the pen or when the pen is moved rapidly as in handwriting, the speed of response of the system to provide an accurate indication of pen position becomes more important. In the latter case, a third routine is implemented, automatically and without further processing necessary to make such decision, wherein the position of the pen is resolved by reference to the signal amplitude on three selected loops and the index or address of the loop with the maximum amplitude signal thereon is incremented or decremented by two.

Figure 9:
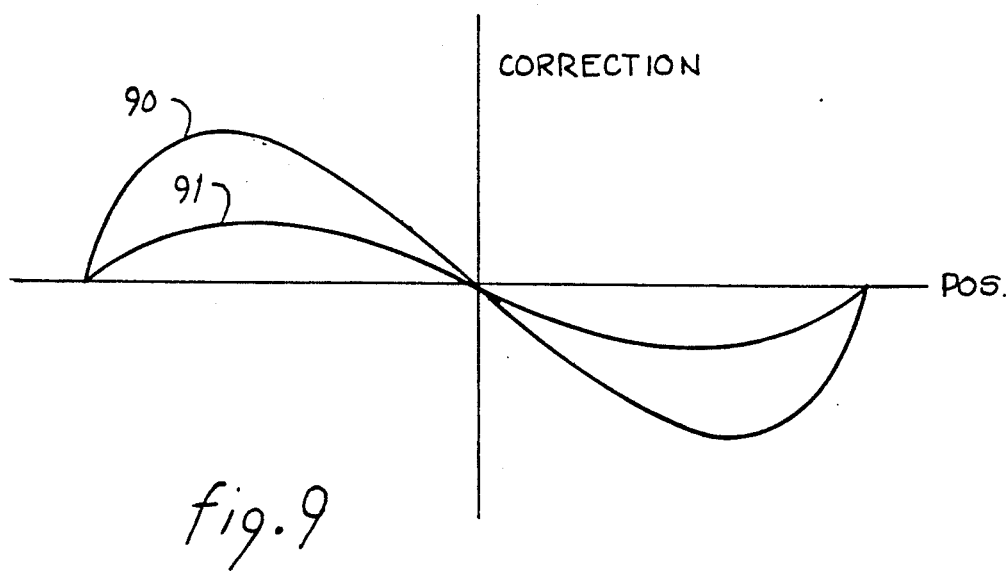
FIG. 9 is an illustration of selected S-curves useful in explaining the operation of the system of the present invention.

When the routine selected relies upon the amplitudes existing on four grid loops, the resulting positional information has been found to be closer to a perfectly linear input/output transfer characteristic than would be expected. That is, for a given change in position of the pen, a perfectly linear system would present the identical position change at its output. Actual systems however always incorporate some degree of non-linearity. In electromagnetic systems of the type described here, this non-linearity is frequently discussed in terms of indicated pen positions and the necessary correction at that indicated position to produce an output that is essentially precisely the actual position. A plot of true positions versus indicated position for two positional routines is shown in FIG. 9; this type of plot is frequently referred to as an "S" curve. The abscissa scale represents the indicated pen position relative to a selected origin in a given direction; the ordinate represents the correction necessary to render the signal derived by the system to precisely concur with actual pen position. By reference to FIG. 9 it may be seen that the correction required is zero at the two indicated position end points. As the pen is moved away from these indicated position end points, the magnitude of the correction that must be added to the indicated position to obtain the actual pen position increases until a positive or negative peak correction is required. This non-linearity should be minimized whenever the tablet is being used for precise drawing applications or where it is important to accurately reproduce handwriting. The S-curve 90 is illustrative of routines such as the above described routine wherein the position is resolved using the signal amplitudes on three selected grid loops. The inherent linearity of the routines utilizing amplitudes on four selected grid loops is shown by reference to curve 91 in FIG. 9. It may be seen that curve 91 is substantially "flatter" than curve 90 and that the necessary correction to the sensed pen position is substantially less.

Figure 10:
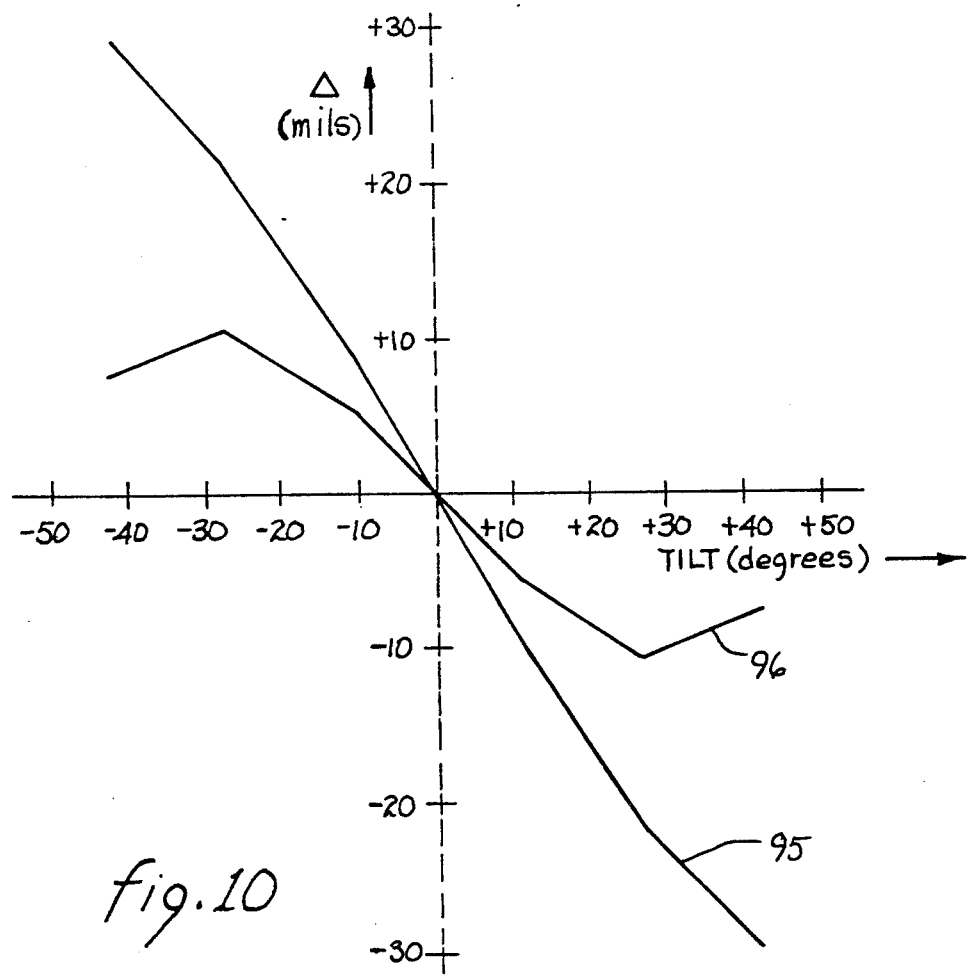
FIG. 10 is a schematic representation of instrument or pen signals useful in describing the phenomena of pen tilt as it affects the system of the present invention.

The above described S-curves show that an anticipated positional error is induced and that this error is non-linear and varies in accordance with pen position. Another positional discrepancy or error enters the system when the angle that the radiating pen makes with the tablet surface is changed. That is, if the operator holds the radiating pen vertically or perpendicular with respect to the plane of the tablet, the resulting S-curves may take the form of those shown in the above described FIG. 9. However, if the pen is tilted to form an angle, for example 30° from perpendicular with respect to the plane of the surface of the tablet, then a second positional error is added to the system. This tilt error may not be significant until the tilt of the pen reaches thirty or more degrees from perpendicular. The above described routine using the amplitude signals derived from four selected grid loops has also shown to be less affected by pen tilt. Referring now to FIG. 10, a plot of pen position errors caused by pen tilt is shown. The necessary correction, or error, is shown as the ordinate scale while the angle of tilt is shown on the abscissa scale. Curve 95 is a plot of a typical tilt error of a routine for determining pen position. It may be seen that as the pen is tilted more than 30°, the tilt induced error continues to increase. In contrast, curve 96 represents a plot of the tilt error resulting from the use of the previously described routines utilizing the amplitude signal on four selected grid loops. It may seen that the tilt error using four grid loops increases at a lower rate up through approximately 30° pen tilt, and that thereafter the error actually decreases.

The significantly increased linearity resulting from the four loop routines is thus represented in improved S-curve correction values; further, this improved linearity is accompanied by substantially improved tilt error characteristics. These four loop routines thus permit significantly increased accuracy in the positional resolution of pen location and do so using only the amplitude signal information present on four grid loops.

The following is a print-out of an implementation of the system of the present invention showing the operation of the system in resolving instrument position and following selected routines to arrive at an estimated instrument address.

```
;I-----SET UP FOR X PROX "NO READ" LOAD NEXT LINE POINTER WITH X 0------
XPROX:  ORI   PF,Bit6
        ANIW  LOW CFLG,9FH    ;CLEAR FIRST AND SECOND INPROX BITS
        ANIW  LOW SFLG,80H
        MVI   A,0             ;START AT X LINE 0;X7 WAS 1
        STAW  LOW NLPTR       ;PUT IN NEXT LINE POINTER
        STAW  LOW XPTR
        ORIW  LOW SFLG,BIT0   ;SET SCAN COMPLATE FLAGE
        LXI   B,XPROX0        ;RESUME AT XPROX0
XPRET:  EXX                   ;GET REGS BACK
        POP   EA
        POP   V
        EI
        RETI
;I-----NO READ SEL X LINE 1 AND CLEAR X MAX DATA REG-------
XPROX0: ANI   PF,NBit6
        INRW  LOW NLPTR       ;SELECT NEXT LINE
        LXI   D,0
        SDED  XMAX            ;CLEAR X MAX LINE DATA
        LXI   B,XPROX1        ;RESUME AT XPROX1
        JRE   XPRET
;I----- READ DATA IF EA > XMAX SAVE EA IN XMAX, &XPTR IN XMPTR----
XPROX1: LDED  XMAX            ;GET LAST DATA
        DGT   EA,D            ;CH IF DATA < MAX
        JR    XPROX2
        DMOV  D,EA            ;SAVE DATA AS MAX
        SDED  XMAX
        LDAW  LOW XPTR        ;SAVE XPTR AS XMPTR
        STAW  LOW XMPTR
XPROX2: INRW  LOW XPTR
        INRW  LOW NLPTR       ;INC X ADDRESS POINTER
        EQIW  LOW XPTR,36     ;CK FOR END OF X;X7 WAS 35
        JRE   YPRET           ;WAIT FOR 35 READS
        LXI   B,YPROX         ;IF END RESUME AT YPROX
        MVI   A,37            ;START AT Y LINE 1;X7 WAS 38
        STAW  LOW NLPTR
        STAW  LOW YPTR
        JR    YPRET
```

```
;I---- FIRST TIME IN Y PROX REUTINE----------
YPROX:      INRW LOW NLPTR
            LXI  B,0
            SBCD YMAX
            LXI  B,YPROX1
YPRET:      EXX                ;GET REGS BACK
            POP  EA
            POP  V
            EI
            RETI
;I----- READ DATA IF EA > YMAX SAVE EA IN YMAX, &YPTR IN YMPTR----
YPROX1:     LDED YMAX          ;GET LAST DATA
            DGT  EA,D          ;CH IF DATA < MAX
            JR   YPROX2
            DMOV D,EA          ;SAVE DATA AS MAX
            SDED YMAX
            LDAW LOW YPTR      ;SAVE YPTR AS YMPTR
            STAW LOW YMPTR
YPROX2:     INRW LOW YPTR
            EQIW LOW NLPTR,63  ;X7 WAS 62
            INRW LOW NLPTR     ;INC Y ADDRESS POINTER
            EQIW LOW YPTR,65   ;CK FOR END OF Y;X7 WAS 63
            JRE  YPRET         ;WAIT FOR 64 READS
            LBCD PPREG         ;GET PEN PROX DATA
            DMOV EA,B
            ORIW LOW SFLG,BIT2 ;SET PROX BITS
            LDED XMAX          ;GET X MAX DATA
            DLT  EA,D          ;CK FOR X PROX
            ANIW LOW SFLG,NBIT2 ;CLR XPROX BIT
            LDED YMAX          ;DO SAME FOR Y
            DLT  EA,D
            ANIW LOW SFLG,NBIT2
            LDAW LOW XMPTR
            NEI  A,0           ;X7 ADD FOR OFFSURFACE STOP
            ANIW LOW SFLG,NBIT2 ;X7
            NEI  A,34          ;X7
            ANIW LOW SFLG,NBIT2 ;X7
            GTI  A,3           ;IF XMPTR >3 SKIP NEXT
            MVI  A,3
            LTI  A,31
            MVI  A,31
            STAW LOW XPTR
            SUI  A,1           ;SET FIRST READ AS X C LINE
            STAW LOW NLPTR
            LDAW LOW YMPTR
            NEI  A,37          ;X7 ADDED FOR EDGE STOP
            ANIW LOW SFLG,NBIT2 ;X7
            NEI  A,63          ;X7
            ANIW LOW SFLG,NBIT2 ;X7
            GTI  A,40
            MVI  A,40
            LTI  A,60
            MVI  A,60
            STAW LOW YPTR
            LXI  B,XPROX
            OFFIW    LOW SFLG,BIT2
            LXI  B,INPRX
NOPRX:      JRE  YPRET
;
INPRX:      LXI  B,YIN1
            SBCD YRESUM
            LXI  B,XIN1
            LDAW LOW YPTR      ;GET Y POINTER
            SUI  A,1
            STAW LOW NLPTR     ;SET NEXT READ FOR Y C LINE
```

```
                JRE     YPRET
EXITI:          EI
                RETI
;*******------- SCAN CHECK AND LOCK ROUTINE ----------*******
;X-SCAN C,D,E LINES
;               IF E-C IS POS READ B
;               IF E-B IS POS READ F
;READ X MAX-1'C' LINE    LOAD X MAX'D'   GOTO XIN2
;
XIN1:           DMOV    D,EA            ;GET LINE DATA
                SDED    XBUF            ;STORE DATA
                LDAW    LOW XPTR
                STAW    LOW NLPTR       ;SET FOR D DATA
                LXI     B,XIN2
                SBCD    XRESUM          ;LOAD NEXT INT POINT
                LBCD    YRESUM
                ONIW    LOW SFLG,BIT2   ;CHECK FOR PROX
                LXI     B,XPROX
                EXX                     ;GET REGS BACK
                POP     EA
                POP     V
                EI
                RETI
;READ X MAX'D' LINE   LOAD X MAX+1'E'    GOTO XIN3
;
XIN2:           DMOV    D,EA            ;GET LINE DATA
                SDED    XBUF+2          ;STORE D DATA
                LDAW    LOW XPTR        ;GET MAX LINE POINTER
                ADI     A,1             ;SET NEXT LINE FOR E
                STAW    LOW NLPTR
                LXI     B,XIN3          ;GET NEXT ENTRY POINT
                SBCD    XRESUM          ;LOAD NEXT INT POINT
                LBCD    YRESUM
                EXX                     ;GET REGS BACK
                POP     EA
                POP     V
                EI
                RETI
;READ X MAX+1'E' LINE    IF C>E LOAD X MAX-2'B' GOTO 4
;                        IF C<=E LOAD X MAX+2,F, GOTO 8
XIN3:           LDAW    LOW XPTR        ;GET MAX LINE POINTER
                DMOV    D,EA            ;GET LINE DATA
                SDED    XBUF+4          ;SAVE E DATA
                LBCD    XBUF            ;GET C DATA INTO EA FOR COMPARSON
                DLT     EA,B            ;IF E < C GO SET F LINE AND GOTO 6
                JR      XIN3A
                SUI     A,2             ;SET B LINE
                LXI     B,XIN4          ;SET GOTO 4
                JR      XIN3B
XIN3A:          LXI     B,XIN7          ;SET GOTO 7
                ADI     A,2             ;SET F LINE
XIN3B:          SBCD    XRESUM          ;LOAD NEXT INT POINT
                STAW    LOW NLPTR
                LBCD    YRESUM
                EXX                     ;GET REGS BACK
                POP     EA
                POP     V
                EI
                RETI
;READ X MAX-2'B' LINE
;SUB B LINE FROM E LINE AND SAVE IN XBUF+6
;IF E-B IN NEG SAVE FOR (D-A)+(E-B)/(D-A)-(E-B) LOAD A GOTO 6
;IF E-B IS POS  SAVE FOR (E-D)+(F-C)/(E-D)-(F-C) LOAD F GOTO 5
XIN4:           LDAW    LOW XPTR        ;SET NEXT LINE FOR X D
                DMOV    D,EA            ;SAVE B LINE IN DE
```

```
                SDED    XPD1            ;HOLD MAX LINE FOR LEFT EDGE
                LBCD    XBUF+4          ;GET E DATA
                DMOV    EA,B
                DSUB    EA,D            ;SUB B LINE FROM E LINE
                DMOV    B,EA            ;PUT DIFFERENCE IN BC
                SBCD    XBUF+6          ;SAVE E-B IN XBUF+6
                OFFI    B,BIT7          ;CHECK IF NEG
                JR      XIN4A           ;IF NEG GO SET A LINE AND RESUME 6
                ADI     A,2             ;SET FOR F LINE
                LXI     B,XIN5
                JR      XIN4B
XIN4A:          SUI     A,3             ;SET FOR A LINE
                LXI     B,XIN6          ;RESUME AT XIN6
XIN4B:          STAW    LOW NLPTR
                SBCD    XRESUM          ;LOAD NEXT INT POINT
                LBCD    YRESUM
                EXX                     ;GET REGS BACK
                POP     EA
                POP     V
                EI
                RETI
;READ X MAX+2 'F' LINE    LOAD X MAX 'C'    GOTO XIN1
;SUB C FORM F
;SAVE (E-B)+(F-C) IN XBUF+10,(E-B)-(F-C) IN XBUF+8
XIN5:           LBCD    XBUF            ;GET C DATA
                DSUB    EA,B            ;SUB C FROM F
                DMOV    D,EA            ;SAVE F-C FOR SUB (E-B)-(F-C)
                LBCD    XBUF+6          ;GET E-B
                DADD    EA,B            ;ADD (E-B)+(F-C) AS MULTIPLYER
                DMOV    H,EA            ;SAVE MULTIPLYER
                SHLD    XBUF+10         ;
                DMOV    EA,B
                DSUB    EA,D            ;SUB (E-B)-(F-C)
                DMOV    B,EA            ;
                SBCD    XBUF+8          ;SAVE IN XBUF+8 AS DIVISOR
                LBCD    XBUF+2          ;GET MAX LINE DATA
                SBCD    XPD2            ;SAVE MAX LINE DATA FOR CALC "D"
                DMOV    EA,B
                LBCD    PPREG           ;CHECK FOR PROX
                DGT     EA,B
                ANIW    LOW SFLG,NBIT2  ;X INPROX FLAG
                LDAW    LOW XPTR        ;SET NEXT LINE FOR X C
                STAW    LOW XLINE
                SUI     A,1             ;SET FOR C DATA
                STAW    LOW NLPTR
                LXI     B,XIN1          ;
                SBCD    XRESUM          ;LOAD NEXT INT POINT
                LBCD    YRESUM
                EXX                     ;GET REGS BACK
                POP     EA
                POP     V
                EI
                RETI
;READ X MAX-3 'A'         GOTO XIN1
;SUB A FROM D AND IF NEG USE (D-A)/(C-D)
;IF POS USE (D-A)+(E-D)/(D-A)-(E-B) AND DEC POINTER
XIN6:           DMOV    B,EA            ;X7 SAVE G LINE DATA
                SBCD    XEND            ;X7 IN LAST LINE DATA
                DMOV    D,EA            ;GET A LINE DATA IN DE
                LBCD    XBUF+2          ;GET D LINE DATA
                DMOV    EA,B
                DSUB    EA,D            ;SUB A FROM D
                DMOV    B,EA            ;SAVE D-A IN BC
                OFFI    B,BIT7          ;IF D-A NEG
                JRE     XIN6A           ;GO USE D-A/C-D
```

```
            LDED  XBUF+6            ;GET E-B
            DADD  EA,D       ;ADD (D-A)+(E-B)
            DMOV  H,EA
            SHLD  XBUF+10           ;SAVE MULTIPLYER
            DMOV  EA,B       ;GET D-A BACK
            DSUB  EA,D       ;SUB (D-A)-(E-B)
            DMOV  B,EA
            SBCD  XBUF+8            ;SAVE DIVISOR
            LBCD  XBUF       ;GET MAX LINE DATA C
            SBCD  XPD2       ;SAVE MAX LINE DATA FOR PEN DOWN
            DMOV  EA,B
            LBCD  PPREG             ;CHECK FOR PROX
            DGT   EA,B
            ANIW  LOW SFLG,NBIT2 ;X INPROX FLAG
            GTIW  LOW XPTR,3    ;IF POINTER IS > 3 OF
            JRE   XIN62
            DCRW  LOW XPTR
            LDAW  LOW XPTR  ;SET NEXT LINE POINTER
            STAW  LOW XLINE        ;SAVE FOR CALC
            SUI   A,1        ;SET NEXT SCAN FOR LINE C
            JRE   XIN6B
XIN62:      MVI   A,3        ;SET NEXT LINE POINTER
            STAW  LOW XPTR   ;SET NEXT SCAN FOR LINE C
            DCR   A          ;A = C LINE FOR NEXT READ
            STAW  LOW XLINE  ;SAVE FOR CALC
            JRE   XIN6B
XIN6A:      SBCD  XBUF+10           ;SAVE MULTIPLYER
            LBCD  XBUF       ;GET C DATA
            DMOV  EA,D
            LDED  XBUF+2
            DSUB  EA,D       ;SUB C-D
            DMOV  D,EA
            SDED  XBUF+8            ;SAVE DIVISOR
            LBCD  XPD1       ;GET MAX LINE DATA"B"
            SBCD  XPD2       ;SAVE FOR PEN DOWN CK IN CALC
            DMOV  EA,B
            LBCD  PPREG             ;CHECK FOR PROX
            DGT   EA,B
            ANIW  LOW SFLG,NBIT2 ;X INPROX FLAG
            LBCD  XEND       ;X7 GET G LINE BACK
            DGT   EA,B       ;X7 CHECK IF G LINE > F LINE
            ANIW  LOW SFLG,NBIT2 ;X7 IF G > F CLEAR IN PROX BIT
            ORIW  LOW CFLG,BIT0  ;SET I20 BIT
            LDAW  LOW XPTR   ;SET NEXT LINE FOR X C
            SUI   A,2
            STAW  LOW XLINE
            ADI   A,1
            GTIW  LOW XPTR,3    ;IF POINTER IS > 3 OF
            JRE   XIN6b
            ldaw  low xptr
            sui   a,2
            staw  low xptr
            dcr   a
XIN6B:      LXI   B,XIN1            ;SET START OF NEXT SCAN
            STAW  LOW NLPTR
            SBCD  XRESUM            ;LOAD NEXT INT POINT
            LBCD  YRESUM
            EXX              ;GET REGS BACK
            POP   EA
            POP   V
            EI
            RETI
;READ X MAX+2'F' LINE
;SUB C LINE FROM F LINE AND SAVE IN XBUF+6
;IF F-C IN POS SAVE FOR (F-C)+(G-D)/(F-C)-(G-D) LOAD G GOTO 9
```

```
;IF F-C IS NEG   SAVE FOR (E-B)+(F-C)/(E-B)-(F-C) LOAD F GOTO 8
XIN7:       DMOV  D,EA          ;
            SDED  XPD1          ;SAVE MAX LINE DATA FOR RIGHT EDGE
            LDAW  LOW XPTR      ;SET NEXT LINE FOR X D
            LBCD  XBUF          ;GET C DATA
            DSUB  EA,B          ;SUB C LINE FROM F LINE
            DMOV  B,EA          ;PUT DIFFERENCE IN BC
            SBCD  XBUF+6        ;SAVE F-C IN XBUF+6
            ONI   B,BIT7        ;CHECK IF POS
            JR    XIN7A         ;IF POS GO SET G LINE AND RESUME 9
            SUI   A,2           ;SET FOR B LINE
            LXI   B,XIN8
            JR    XIN7B
XIN7A:      ADI   A,3           ;SET FOR G LINE
            LXI   B,XIN9        ;RESUME AT XIN9
XIN7B:      STAW  LOW NLPTR
            SBCD  XRESUM        ;LOAD NEXT INT POINT
            LBCD  YRESUM
            EXX                 ;GET REGS BACK
            POP   EA
            POP   V
            EI
            RETI
;READ X MAX-2'B' LINE    LOAD X MAX'C'  GOTO XIN1
;SUB B FORM E
;SAVE (E-B)+(F-C) IN XBUF+10,(E-B)-(F-C) IN XBUF+8
XIN8:       DMOV  D,EA
            LBCD  XBUF+4        ;GET E DATA
            DMOV  EA,B
            DSUB  EA,D          ;SUB B FROM E
            DMOV  D,EA          ;SAVE E-B FOR SUB (E-B)-(F-C)
            LBCD  XBUF+6        ;GET F-C
            DADD  EA,B          ;ADD (E-B)+(F-C) AS MULTIPLYER
            DMOV  H,EA          ;SAVE MULTIPLYER
            SHLD  XBUF+10       ;
            DMOV  EA,D
            DSUB  EA,B          ;SUB (E-B)-(F-C)
            DMOV  B,EA          ;
            SBCD  XBUF+8        ;SAVE IN XBUF+8 AS DIVISOR
            LBCD  XBUF+2        ;GET MAX LINE DATA
            SBCD  XPD2          ;SAVE MAX LINE DATA FOR CALCX
            DMOV  EA,B
            LBCD  PPREG         ;CHECK FOR PROX
            DGT   EA,B
            ANIW  LOW SFLG,NBIT2 ;X INPROX FLAG
            LDAW  LOW XPTR      ;SET NEXT LINE FOR X C
            STAW  LOW XLINE
            SUI   A,1           ;SET FOR C DATA
            STAW  LOW NLPTR
            LXI   B,XIN1        ;
            SBCD  XRESUM        ;LOAD NEXT INT POINT
            LBCD  YRESUM
            EXX                 ;GET REGS BACK
            POP   EA
            POP   V
            EI
            RETI
;READ X MAX+3'G' LINE    LOAD X MAX-1'C'    GOTO 1
;SUB D LINE FROM G IF G-D IS POS USE G-D/E-D
;IF G-D IS NEG USE (F-C)+(G-D)/(F-C)-(G-D)
XIN9:       DMOV  B,EA          ;X7 SAVE G LINE DATA
            SBCD  XEND          ;IN LLINE LAST LINE DATA
            LBCD  XBUF+2        ;X7 GET D LINE DATA
            DSUB  EA,B          ;GET G-D
            DMOV  D,EA          ;SAVE G-D IN DE
```

```
        ONI   D,BIT7            ;CHECK IF G-D IS POS
        JRE   XIN9A             ;IF POS GO DO G-D/E-D
        LBCD  XBUF+6            ;GET F-C DATA
        DADD  EA,B              ;ADD (F-C)+(G-D)
        DMOV  H,EA
        SHLD  XBUF+10           ;SAVE MULTIPLYER
        DMOV  EA,B
        DSUB  EA,D              ;SUB (F-C)-(G-D)
        DMOV  B,EA
        SBCD  XBUF+8
        LBCD  XBUF+4            ;GET MAX LINE
        SBCD  XPD2
        DMOV  EA,B
        LBCD  PPREG             ;GET PROX NUMBER
        DGT   EA,B
        ANIW  LOW SFLG,NBIT2
        LTIW  LOW XPTR,31       ;IF POINTER IS <31 DONT LOAD 31
        JRE   XIN92
        INRW  LOW XPTR
        LDAW  LOW XPTR          ;SET NEXT LINE POINTER
        STAW  LOW XLINE         ;SAVE FOR CALC
        DCR   A                 ;SET NEXT SCAN FOR LINE C
        JRE   XIN9B
XIN92:  MVI   A,31              ;SET NEXT LINE POINTER
        STAW  LOW XPTR          ;SET NEXT SCAN FOR LINE C
        ADI   A,1
        STAW  LOW XLINE         ;SAVE FOR CALC
        SUI   A,2
        JRE   XIN9B
XIN9A:  SDED  XBUF+10           ;SAVE G-D AS MULTIPLYER
        LHLD  XBUF+4            ;GET E DATA
        DMOV  EA,H
        DSUB  EA,B              ;SUB E-D
        DMOV      B,EA
        SBCD  XBUF+8            ;SAVE E-D AS DIVISOR
        LDAW  LOW XPTR
        ADI   A,1
        STAW  LOW XLINE         ;SAVE X LINE
        SUI   A,2               ;SET LINE C
        LBCD  XPD1              ;GET MAX LINE "F"
        SBCD  XPD2
        DMOV  EA,B
        LBCD  PPREG             ;GET PROX NUMBER
        DGT   EA,B
        ANIW  LOW SFLG,NBIT2
        LBCD  XEND              ;X7 GET G LINE BACK
        DGT   EA,B              ;X7 CHECK IF G LINE > F LINE
        ANIW  LOW SFLG,NBIT2    ;X7 IF G > F CLEAR IN PROX BIT
        ORIW  LOW CFLG,BIT0     ;SET SUB 120 FLAG
        LTIW  LOW XPTR,31       ;IF POINTER IS <31 DONT LOAD 31
        JRE   XIN9b
        ldaw  low xptr
        adi   a,2
        staw  low xptr
        dcr   a
XIN9B:  STAW  LOW NLPTR
        LXI   B,XIN1
        SBCD  XRESUM            ;LOAD NEXT INT POINT
        LBCD  YRESUM
        EXX                     ;GET REGS BACK
        POP   EA
        POP   V
        EI
        RETI
;*******-------- SCAN CHECK AND LOCK ROUTINE -----------********
```

```
;Y-SCAN C,D,E LINES
;          IF E-C IS POS READ B
;          IF E-B IS POS READ F
;READ Y MAX-1'C' LINE     LOAD Y MAX'D'  GOTO YIN2
;
YIN1:      DMOV D,EA          ;GET LINE DATA
           SDED YBUF          ;STORE DATA
           LDAW LOW YPTR
           STAW LOW NLPTR     ;SET FOR D DATA
           LXI  B,YIN2
           SBCD YRESUM        ;LOAD NEXT INT POINT
           LBCD XRESUM
           EXX                ;GET REGS BACK
           POP  EA
           POP  V
           EI
           RETI
;READ Y MAX'D' LINE  LOAD Y MAX+1'E'    GOTO YIN3
;
YIN2:      DMOV D,EA          ;GET LINE DATA
           SDED YBUF+2        ;STORE D DATA
           LDAW LOW YPTR      ;GET MAX LINE POINTER
           ADI  A,1           ;SET NEXT LINE FOR E
           STAW LOW NLPTR
           LXI  B,YIN3        ;GET NEXT ENTRY POINT
           SBCD YRESUM        ;LOAD NEXT INT POINT
           LBCD XRESUM
           EXX                ;GET REGS BACK
           POP  EA
           POP  V
           EI
           RETI
;READ Y MAX+1'E' LINE    IF C>E LOAD Y MAX-2'B' GOTO 4
;                        IF C<=E LOAD Y MAX+2,F, GOTO 8
YIN3:      LDAW LOW YPTR      ;GET MAX LINE POINTER
           DMOV D,EA          ;GET LINE DATA
           SDED YBUF+4        ;SAVE E DATA
           LBCD YBUF          ;GET C DATA INTO EA FOR COMPARSON
           DLT  EA,B          ;IF E < C GO SET F LINE AND GOTO 6
           JR   YIN3A
           SUI  A,2           ;SET B LINE
           LXI  B,YIN4        ;SET GOTO 4
           JR   YIN3B
YIN3A:     LXI  B,YIN7        ;SET GOTO 7
           ADI  A,2           ;SET F LINE
YIN3B:     SBCD YRESUM        ;LOAD NEXT INT POINT
           STAW LOW NLPTR
           LBCD XRESUM
           EXX                ;GET REGS BACK
           POP  EA
           POP  V
           EI
           RETI
;READ Y MAX-2'B' LINE
;SUB B LINE FROM E LINE AND SAVE IN YBUF+6
;IF E-B IN NEG SAVE FOR (D-A)+(E-B)/(D-A)-(E-B) LOAD A GOTO 6
;IF E-B IS POS  SAVE FOR (E-D)+(F-C)/(E-D)-(F-C) LOAD F GOTO 5
YIN4:      LDAW LOW YPTR      ;SET NEXT LINE FOR Y D
           DMOV D,EA          ;SAVE B LINE IN DE
           SDED YPD1          ;HOLD MAX LINE FOR BOTTOM EDGE
           LBCD YBUF+4        ;GET E DATA
           DMOV EA,B
           DSUB EA,D          ;SUB B LINE FROM E LINE
           DMOV B,EA          ;PUT DIFFERENCE IN BC
           SBCD YBUF+6        ;SAVE E-B IN YBUF+6
```

```
            OFFI B,BIT7         ;CHECK IF NEG
            JR   YIN4A          ;IF NEG GO SET A LINE AND RESUME 6
            ADI  A,2            ;SET FOR F LINE
            LXI  B,YIN5
            JR   YIN4B
YIN4A:      SUI  A,3            ;SET FOR A LINE
            LXI  B,YIN6         ;RESUME AT YIN6
YIN4B:      STAW LOW NLPTR
            SBCD YRESUM         ;LOAD NEXT INT POINT
            LBCD XRESUM
            EXX                 ;GET REGS BACK
            POP  EA
            POP  V
            EI
            RETI
;READ Y MAX+2'F' LINE    LOAD Y MAX'C'  GOTO YIN1
;SUB C FORM F
;SAVE (E-B)+(F-C) IN YBUF+10,(E-B)-(F-C) IN YBUF+8
YIN5:       ORI  PF,Bit6
            LBCD YBUF           ;GET C DATA
            DSUB EA,B           ;SUB C FROM F
            DMOV D,EA           ;SAVE F-C FOR SUB (E-B)-(F-C)
            LBCD YBUF+6         ;GET E-B
            DADD EA,B           ;ADD (E-B)+(F-C) AS MULTIPLYER
            DMOV H,EA           ;SAVE MULTIPLYER
            SHLD YBUF+10        ;
            DMOV EA,B
            DSUB EA,D           ;SUB (E-B)-(F-C)
            DMOV B,EA           ;
            SBCD YBUF+8         ;SAVE IN YBUF+8 AS DIVISOR
            LBCD YBUF+2         ;GET MAX LINE DATA
            SBCD YPD2           ;SAVE MAX LINE DATA FOR CALC "D"
            DMOV EA,B
            LBCD PPREG          ;CHECK FOR PROX
            DGT  EA,B
            ANIW LOW SFLG,NBIT2 ;CLEAR INPROX FLAG
            LDAW LOW YPTR       ;SET NEXT LINE FOR Y C
            STAW LOW YLINE
            SUI  A,1            ;SET FOR C DATA
            STAW LOW NLPTR
            LXI  B,YIN1         ;
            SBCD YRESUM         ;LOAD NEXT INT POINT
            LBCD XRESUM
            ORIW LOW SFLG,BIT0  ;SET SCAN COMPLATE FLAGE
            ANI  PF,NBit6
            EXX                 ;GET REGS BACK
            POP  EA
            POP  V
            EI
            RETI
;READ Y MAX-3'A'         GOTO YIN1
;SUB A FROM D AND IF NEG USE (D-A)/(C-D)
;IF POS USE (D-A)+(E-D)/(D-A)-(E-B) AND DEC POINTER
YIN6:       ORI  PF,Bit6
            DMOV D,EA           ;GET A LINE DATA IN DE
            LBCD YBUF+2         ;GET D LINE DATA
            DMOV EA,B
            DSUB EA,D           ;SUB A FROM D
            DMOV B,EA           ;SAVE D-A IN BC
            OFFI B,BIT7         ;IF D-A NEG
            JRE  YIN6A          ;GO USE D-A/C-D
            LDED YBUF+6         ;GET E-B
            DADD EA,D           ;ADD (D-A)+(E-B)
            DMOV H,EA
            SHLD YBUF+10        ;SAVE MULTIPLYER
```

```
            DMOV EA,B          ;GET D-A BACK
            DSUB EA,D          ;SUB (D-A)-(E-B)
            DMOV B,EA
            SBCD YBUF+8        ;SAVE DIVISOR
            LBCD YBUF          ;GET MAX LINE DATA C
            SBCD YPD2          ;SAVE MAX LINE DATA FOR PEN DOWN
            DMOV EA,B
            LBCD PPREG         ;CHECK FOR PROX
            DGT  EA,B
            ANIW LOW SFLG,NBIT2 ;CLEAR INPROX FLAG
            GTIW LOW YPTR,40   ;IF POINTER IS > 3 OF
            JR   YIN62
            DCRW LOW YPTR
            LDAW LOW YPTR      ;SET NEXT LINE POINTER
            STAW LOW YLINE     ;SAVE FOR CALC
            SUI  A,1           ;SET NEXT SCAN FOR LINE C
            JRE  YIN6B
YIN62:      MVI  A,40          ;SET NEXT LINE POINTER
            STAW LOW YPTR      ;SET NEXT SCAN FOR LINE C
            DCR  A             ;A = C LINE FOR NEXT READ
            STAW LOW YLINE     ;SAVE FOR CALC
            JRE  YIN6B
YIN6A:      SBCD YBUF+10       ;SAVE MULTIPLYER
            LDED YBUF          ;GET C DATA
            DMOV EA,D
            LDED YBUF+2
            DSUB EA,D          ;SUB C-D
            DMOV D,EA
            SDED YBUF+8        ;SAVE DIVISOR
            LBCD YPD1          ;GET MAX LINE DATA"B"
            SBCD YPD2          ;SAVE FOR PEN DOWN CK IN CALC
            DMOV EA,B
            LBCD PPREG         ;CHECK FOR PROX
            DGT  EA,B
            ANIW LOW SFLG,NBIT2 ;CLEAR INPROX FLAG
            ORIW LOW CFLG,BIT1 ;SET I20 BIT
            LDAW LOW YPTR      ;SET NEXT LINE FOR X C
            SUI  A,2
            STAW LOW YLINE
            ADI  A,1
            GTIW LOW YPTR,40   ;IF POINTER IS > 3 OF
            JR   YIN6b
            ldaw low yptr
            sui  a,2
            staw low yptr
            dcr  a
YIN6B:      LXI  B,YIN1        ;SET START OF NEXT SCAN
            STAW LOW NLPTR
            SBCD YRESUM        ;LOAD NEXT INT POINT
            LBCD XRESUM
            ANI  PF,NBit6
            ORIW LOW SFLG,BIT0 ;SET SCAN COMPLATE FLAGE
            EXX                ;GET REGS BACK
            POP  EA
            POP  V
            EI
            RETI
;READ Y MAX+2'F' LINE
;SUB C LINE FROM F LINE AND SAVE IN YBUF+6
;IF F-C IN POS SAVE FOR (F-C)+(G-D)/(F-C)-(G-D) LOAD G GOTO 9
;IF F-C IS NEG  SAVE FOR (E-B)+(F-C)/(E-B)-(F-C) LOAD F GOTO 8
YIN7:       DMOV D,EA          ;
            SDED YPD1          ;SAVE MAX LINE DATA FOR RIGHT EDGE
            LDAW LOW YPTR      ;SET NEXT LINE FOR Y D
            LBCD YBUF          ;GET C DATA
```

```
            DSUB EA,B         ;SUB C LINE FROM F LINE
            DMOV B,EA         ;PUT DIFFERENCE IN BC
            SBCD YBUF+6           ;SAVE F-C IN YBUF+6
            ONI  B,BIT7       ;CHECK IF POS
            JR   YIN7A        ;IF POS GO SET G LINE AND RESUME 9
            SUI  A,2          ;SET FOR B LINE
            LXI  B,YIN8
            JR   YIN7B
YIN7A:      ADI  A,3          ;SET FOR G LINE
            LXI  B,YIN9           ;RESUME AT YIN9
YIN7B:      STAW LOW NLPTR
            SBCD YRESUM           ;LOAD NEXT INT POINT
            LBCD XRESUM
            EXX                   ;GET REGS BACK
            POP  EA
            POP  V
            EI
            RETI
;READ Y MAX-2'B' LINE    LOAD Y MAX'C'  GOTO YIN1
;SUB B FORM E
;SAVE (E-B)+(F-C) IN YBUF+10,(E-B)-(F-C) IN YBUF+8
YIN8:       ORI  PF,Bit6
            DMOV D,EA
            LBCD YBUF+4           ;GET E DATA
            DMOV EA,B
            DSUB EA,D         ;SUB B FROM E
            DMOV D,EA         ;SAVE E-B FOR SUB (E-B)-(F-C)
            LBCD YBUF+6           ;GET F-C
            DADD EA,B         ;ADD (E-B)+(F-C) AS MULTIPLYER
            DMOV H,EA         ;SAVE MULTIPLYER
            SHLD YBUF+10          ;
            DMOV EA,D
            DSUB EA,B         ;SUB (E-B)-(F-C)
            DMOV B,EA         ;
            SBCD YBUF+8           ;SAVE IN YBUF+8 AS DIVISOR
            LBCD YBUF+2           ;GET MAX LINE DATA
            SBCD YPD2         ;SAVE MAX LINE DATA FOR CALCY
            DMOV EA,B
            LBCD PPREG            ;CHECK FOR PROX
            DGT  EA,B
            ANIW LOW SFLG,NBIT2 ;CLEAR INPROX FLAG
            LDAW LOW YPTR   ;SET NEXT LINE FOR Y C
            STAW LOW YLINE
            SUI  A,1          ;SET FOR C DATA
            STAW LOW NLPTR
            LXI  B,YIN1       ;
            SBCD YRESUM           ;LOAD NEXT INT POINT
            LBCD XRESUM
            ANI  PF,NBit6
            ORIW LOW SFLG,BIT0   ;SET SCAN COMPLATE FLAGE
            EXX                   ;GET REGS BACK
            POP  EA
            POP  V
            EI
            RETI
;READ Y MAX+3'G' LINE    LOAD Y MAX-1'C'    GOTO 1
;SUB D LINE FROM G IF G-D IS POS USE G-D/E-D
;IF G-D IS NEG USE (F-C)+(G-D)/(F-C)-(G-D)
YIN9:       ORI  PF,Bit6
            LBCD YBUF+2           ;GET D LINE DATA
            DSUB EA,B         ;GET G-D
            DMOV D,EA         ;SAVE G-D IN DE
            ONI  D,BIT7           ;CHECK IF G-D IS POS
            JRE  YIN9A            ;IF POS GO DO G-D/E-D
            LBCD YBUF+6           ;GET F-C DATA
```

```
                DADD  EA,B         ;ADD (F-C)+(G-D)
                DMOV  H,EA
                SHLD  YBUF+10      ;SAVE MULTIPLYER
                DMOV  EA,B
                DSUB  EA,D         ;SUB (F-C)-(G-D)
                DMOV  B,EA
                SBCD  YBUF+8
                LBCD  YBUF+4       ;GET MAX LINE C
                SBCD  YPD2
                DMOV  EA,B
                LBCD  PPREG        ;GET PROX NUMBER
                DGT   EA,B
                ANIW  LOW SFLG,NBIT2 ;CLEAR INPROX FLAG
                LTIW  LOW YPTR,60  ;IF POINTER IS <33 DONT LOAD 33
                JR    YIN92
                INRW  LOW YPTR
                LDAW  LOW YPTR     ;SET NEXT LINE POINTER
                STAW  LOW YLINE    ;SAVE FOR CALC
                SUI   A,1          ;SET NEXT SCAN FOR LINE C
                JRE   YIN9B
YIN92:          MVI   A,60         ;SET NEXT LINE POINTER
                STAW  LOW YPTR     ;SET NEXT SCAN FOR LINE C
                ADI   A,1
                STAW  LOW YLINE    ;SAVE FOR CALC
                SUI   A,2
                JRE   YIN9B
YIN9A:          SDED  YBUF+10      ;SAVE G-D AS MULTIPLYER
                LHLD  YBUF+4       ;GET E DATA
                DMOV  EA,H
                DSUB  EA,B         ;SUB E-D
                DMOV      B,EA
                SBCD  YBUF+8       ;SAVE E-D AS DIVISOR
                LDAW  LOW YPTR
                ADI   A,1
                STAW  LOW YLINE    ;SAVE Y LINE
                SUI   A,2          ;SET LINE C
                LBCD  YPD1         ;GET MAX LINE "F"
                SBCD  YPD2
                DMOV  EA,B
                LBCD  PPREG        ;GET PROX NUMBER
                DGT   EA,B
                ANIW  LOW SFLG,NBIT2 ;CLEAR INPROX FLAG
                ORIW  LOW CFLG,BIT1 ;SET SUB 120 FLAG
                LTIW  LOW YPTR,60  ;IF POINTER IS <33 DONT LOAD 33
                JR    YIN9b
                ldaw  low yptr
                adi   a,2
                staw  low yptr
                dcr   a
YIN9B:          STAW  LOW NLPTR
                LXI   B,YIN1
                SBCD  YRESUM       ;LOAD NEXT INT POINT
                LBCD  XRESUM
                ANI   PF,NBit6
                ORIW  LOW SFLG,BIT0 ;SET SCAN COMPLATE FLAGE
                EXX                ;GET REGS BACK
                POP   EA
                POP   V
                EI
                RETI
;=============CALCULATE DATA ROUTINE=================
; CALCX TAKE'S LINE DATA = (E-B)+(F-C) * 128 / (E-B)-(F-C)
CALCX:          ANIW  LOW SFLG,NBIT0 ;CLR SCAN COMPLETE FLAG
                aniw  low stat,0fch ;clr pen down and prox bits
                oNiw  low sflg,bit2 ;if no prox ret
```

```
                jmp   form3
                lbcd  xpd2          ;get x max data reg
                lded  ypd2          ;get y max data reg
                dmov  ea,d          ;put y in ea
                dsub  ea,b          ;sub x from y
                dmov  h,ea
                oni   h,bit7        ;get posative difference
                jr    eapos
                dmov  ea,b
                dsub  ea,d
eapos:          lxi   b,300         ;if diff is > 300
                dlt   ea,b          ;
                aniw  low sflg,nbit2 ;clr out of prox flag
                ANIW  LOW CFLG,NBIT7 ;CLR SIGN BIT
                LBCD  XBUF+10       ;GET (E-B) + (F-C)
                ONI   B,BIT7        ;CHECK FOR NEG MUL
                JR    CALC1         ;IF POS GO CAL DATA
                LXI   D,00          ;SET EA = 0 FOR COMP DATA
                DMOV  EA,D
                DSUB  EA,B
                DMOV  B,EA
                ORIW  LOW CFLG,BIT7 ;SET SIGN BIT
CALC1:          LXI   D,120         ;GET 1/2 LINE SPACING COUNTS
                CALL  MUL16         ;MUL 120 TIMES A OR C DATA
                MOV   A,EAL         ;GET LOW BYTE OF HIGH DATA
                DMOV  EA,H          ;GET LOWER 2 BYTES FOR DIV
                LDED  XBUF+8
                CALL  DIV24         ;ON RET DE = DATA
;----- GET SCURVE TABLE ADDRESS AND DO CORRECTION ---------
                LXI   H,SC_TBL
                MOV   A,E
                LDAX  H+A           ;GET CORRECTION NUMBER
                ADD   E,A
                MVI   A,0           ;CLEAR EA LOW
                MOV   EAL,A
;------- GET LOCATION DATA AND ADD OR SUB LOOP DATA -------
                LDAW  LOW XLINE     ;GET X LINE POINTER
                ADI   A,1
                MVI   C,240
                MUL   C             ;MUL LINE # BY 240
                LXI   B,120
                OFFIW     LOW CFLG,BIT0
                DADD  EA,B
                OFFIW     LOW CFLG,BIT7  ;CHECK FOR NEG SIGN
                JR    X_NEG
                DADD  EA,D          ;ADD LINE DATA
                JR    X_POS
X_NEG:          DSUB  EA,D
;------- SET AND CORRECT ORIGIN AND MAX DATA -------------
X_POS:          LXI   D,240         ;SUB ORIGIN
                DSUB  EA,D
                DMOV  D,EA          ;SAVE DATA IN DE
                OFFI  D,BIT7
                JMP   FORM3         ;IF BELOW
                LXI   H,Xmid        ;GET START OF CORR TABLE
                mov   a,eah
                lxi   b,0           ;clear ea
                dmov  ea,b
                mov   eal,a         ;get data / 256
                DADD  EA,H
                DMOV  H,EA
                LDAX  H             ;GET CORRECTION NUMBER
                DMOV  EA,D
                EADD  EA,A          ;EA = CORRECTED DATA
                DMOV  D,EA
```

```
        LXI   B,150              ;CHECK LEFT ORIGIN
        DGT   EA,B
        JMP   FORM3
        LXI   B,7980
        DLT   EA,B               ;CHECK RIGHT ORIGIN
        JMP   FORM3
        LXI   B,6390             ;GET START OF RIGHT CORRECTION
        DSUB  EA,B               ;SUB FROM DATA
        DMOV  B,EA
        OFFI  B,BIT7
        JR    X_LEFT             ;IF NEG GO CHECK LEFT EDGE
        LXI   H,XRIGHT           ;GET START OF CORR TABLE
        DSLR  EA
        DSLR  EA
        DSLR  EA                 ;DIV EA BY 8
        DADD  EA,H
        DMOV  H,EA
        LDAX  H                  ;GET CORRECTION NUMBER
        DMOV  EA,D
        EADD  EA,A               ;EA = CORRECTED DATA
        DMOV  D,EA
        JR    CK_ORG
X_LEFT: LXI   B,1770             ;GET START OF LEFT CORRECTION
        DMOV  EA,B               ;PUT IN EA
        DGT   EA,D               ;CK IF DATA IS GREATER THEN START
        JR    CK_ORG
        DSUB  EA,D               ;SUB DATA FROM START
        LXI   H,XLEFT            ;GET START OF CORR TABLE
        DSLR  EA
        DSLR  EA
        DSLR  EA                 ;DIV EA BY 8
        DADD  EA,H
        DMOV  H,EA
        LDAX  H
        DMOV  EA,D
        ESUB  EA,A
        DMOV  D,EA
CK_ORG: SDED  XDATA
        lbcd  xdata1
        dsub  ea,b
        dmov  d,ea
        sded  xdif               ;get x difference
;=============CALCULATE DATA ROUTINE=================
; CALCY TAKE'S LINE DATA = (E-B)+(F-C) * 128 / (E-B)-(F-C)
;
CALCY:  ANIW  LOW CFLG,NBIT7  ;CLR SIGN BIT
        LBCD  YBUF+10            ;GET (E-B) + (F-C)
        ONI   B,BIT7             ;CHECK FOR NEG MUL
        JR    CALC2              ;IF POS GO CAL DATA
        LXI   D,00               ;SET EA = 0 FOR COMP DATA
        DMOV  EA,D
        DSUB  EA,B
        DMOV  B,EA
        ORIW  LOW CFLG,BIT7   ;SET SIGN BIT
CALC2:  LXI   D,120     ;GET 1/2 LINE SPACING COUNTS
        CALL  MUL16     ;MUL 120 TIMES A OR C DATA
        MOV   A,EAL     ;GET LOW BYTE OF HIGH DATA
        DMOV  EA,H ;GET LOWER 2 BYTES FOR DIV
        LDED  YBUF+8    ;GET DIVISOR
        CALL  DIV24     ;ON RET DE = DATA
        LXI   H,SC_TBL
        MOV   A,E
        LDAX  H+A
        ADD   E,A
        MVI   A,0       ;CLEAR EA LOW
```

```
              MOV   EAL,A
              LDAW  LOW YLINE    ;GET Y LINE POINTER
              SUI   A,36
              MVI   C,240
              MUL   C            ;MUL LINE # BY 240
              LXI   B,120
              OFFIW      LOW CFLG,BIT1
              DADD  EA,B
              ANIW  LOW CFLG,0FCH   ;CLEAR I20 BITS
              OFFIW      LOW CFLG,BIT7   ;CHECK FOR NEG SIGN
              JR    Y_NEG
              DADD  EA,D         ;ADD LINE DATA
              JR    Y_POS
Y_NEG:        DSUB  EA,D
Y_POS:        LXI   D,240        ;SUB ORIGIN
              DSUB  EA,D
              DMOV  D,EA
              OFFI  D,BIT7
              JMP   FORM3
              LXI   H,Ymid       ;GET START OF CORR TABLE
              mov   a,eah
              lxi   b,0          ;clear ea
              dmov  ea,b
              mov   eal,a        ;get data / 256
              DADD  EA,H
              DMOV  H,EA
              LDAX  H            ;GET CORRECTION NUMBER
              DMOV  EA,D
              EADD  EA,A         ;EA = CORRECTED DATA
              DMOV  D,EA
              LXI   B,150
              DGT   EA,B         ;CHECK LOWER MARGIN
              JMP   FORM3
              LXI   B,6050
              DLT   EA,B         ;CHECK UPPER MARGIN
              JMP   FORM3
              LXI   B,4470       ;GET START OF RIGHT CORRECTION
              DSUB  EA,B         ;SUB FROM DATA
              DMOV  B,EA
              OFFI  B,BIT7
              JR    Y_BOT        ;IF NEG GO CHECK BOTTOM EDGE
              LXI   H,YTOP       ;GET START OF CORR TABLE
              DSLR  EA
              DSLR  EA
              DSLR  EA           ;DIV EA BY 8
              DADD  EA,H
              DMOV  H,EA
              LDAX  H            ;GET CORRECTION NUMBER
              DMOV  EA,D
              EADD  EA,A         ;EA = CORRECTED DATA
              DMOV  D,EA
              JR    C_ORGY
Y_BOT:        LXI   B,1770       ;GET START OF LEFT CORRECTION
              DMOV  EA,B         ;PUT IN EA
              DGT   EA,D         ;CK IF DATA IS GREATER THEN START
              JR    C_ORGY
              DSUB  EA,D         ;SUB DATA FROM START
              LXI   H,YBOT       ;GET START OF CORR TABLE
              DSLR  EA
              DSLR  EA
              DSLR  EA           ;DIV EA BY 8
              DADD  EA,H
              DMOV  H,EA
              LDAX  H
              DMOV  EA,D
```

```
                ESUB  EA,A
                DMOV  D,EA
    C_ORGY:     SDED  YDATA
                lbcd  ydata1
                dsub  ea,b
                dmov  d,ea
                sded  ydif       ;get y difference
                ANIW  LOW STAT,NBIT0
                OFFIW     LOW SFLG,BIT2
                ORIW  LOW STAT,BIT0   ;SET PROX
                LHLD  PDREG           ;LOAD PEN DOWN SWITCH POINT
                DMOV  EA,H
                LXI   H,100
                OFFIW     LOW STAT1,BIT1 ;CK FOR PEN DOWN LAST TIME
                Dsub  EA,H       ;IF SO LOWER PEN DOWN COUNT
                ORIW  LOW STAT,BIT1   ;CLEAR PEN DOWN
                LDED  XPD2       ;GET X MAX LINE COUNT
                DLT   EA,D       ;CK FOR X PEN DOWN
                ANIW  LOW STAT,NBIT1 ;SET PEN DOWN
                LDED  YPD2       ;GET X MAX LINE COUNT
                DLT   EA,D       ;CK FOR X PEN DOWN
                ANIW  LOW STAT,NBIT1 ;SET PEN DOWN
    ;********** CK STAT CHANGE IN STAT 1 AND 2 *****************
                OFFIW     LOW STAT1,BIT1
                JRE   PDWN       ;IF 1 GO CK STAT2 FOR 1
                ONIW  LOW STAT2,BIT1
                JRE   LDATA      ;IF 0 GO LOAD DATA
                ANIW  LOW STAT2,NBIT1
    ;********** CORRECT DATA FOR PEN DOWN AND PEN UP*************
    ; DATA2 = OLD + DATA / 2 DATA1 = DATA2 + DATA / 2
    CDATA:      LBCD  XDATA           ;GET X NEWEST DATA
                LDED  XOLD       ;GET X OLDEST DATA
                DMOV  EA,D
                DADD  EA,B       ;ADD OLD AND NEW
                DSLR  EA         ;DIV BY 2
                DMOV  D,EA       ;HOLD DATA 2
                DADD  EA,B       ;ADD NEW TO DATA2
                DSLR  EA
                DMOV  B,EA
                SBCD  XDATA1
                SDED  XDATA2
                LBCD  YDATA           ;GET Y NEWEST DATA
                LDED  YOLD       ;GET Y OLDEST DATA
                DMOV  EA,D
                DADD  EA,B       ;ADD OLD AND NEW
                DSLR  EA         ;DIV BY 2
                DMOV  D,EA       ;HOLD DATA 2
                DADD  EA,B       ;ADD NEW TO DATA2
                DSLR  EA
                DMOV  B,EA
                SBCD  YDATA1
                SDED  YDATA2
                ORIW  LOW STAT1,BIT3 ;IF NOT SET DATA CHANGED BITS
                ORIW  LOW STAT2,BIT3    ;    IN STAT 1 AND 2
                JR    LDATA
    ;
    PDWN:       OFFIW     LOW STAT2,BIT1 ;CK FOR PEN DOWN IN DATA 2
                JR    LDATA      ;IF SO GO LOAD
                OFFIW     LOW SFLG,BIT3  ;CK IF SECOND PEN DOWN
                JR    LDATA0
                ANIW  LOW STAT1,NBIT1
                ORIW  LOW SFLG,BIT3
                JRE   CDATA
    LDATA0:     ANIW  LOW SFLG,NBIT3
    LDATA:      ONIW  LOW CFLG,BIT5  ;CK FOR FIRST TIME IN PROX
```

```
         JRE  FPROX
         LBCD XOUT
         SBCD XOLD
         LBCD XDATA2
         SBCD XOUT
         LBCD XDATA1
         SBCD XDATA2
         LBCD XDATA
         SBCD XDATA1
         LBCD YOUT
         SBCD YOLD
         LBCD YDATA2
         SBCD YOUT
         LBCD YDATA1
         SBCD YDATA2
         LBCD YDATA
         SBCD YDATA1
         LDAW LOW STAT2
         STAW LOW OSTAT
         LDAW LOW STAT1
         STAW LOW STAT2
         LDAW LOW STAT
         STAW LOW STAT1
         ANIW LOW CFLG,NBIT2  ;CLR MARGIN FLAG
         JMP  FORM1
;*  ----------  first time in prox routine  ----------
fprox:   lbcd xdata
         sbcd xdata1
         sbcd xdata2
         lbcd ydata
         sbcd ydata1
         sbcd ydata2
         ldaw low stat
         ani  a,0fch              ;clr pen down and prox
         staw low stat
         staw low stat1
         staw low stat2
         oriw low cflg,bit5
         ret
```

What is claimed is:

1. In a position resolving system for resolving the position of a radiating instrument relative to a tablet surface, the improvement comprising:
    (a) a tablet having a plurality of X and Y conductors arranged orthogonally with respect to each other;
    (b) a radiating instrument for radiating an electromagnetic signal at a first amplitude, from said instrument to said tablet; and
    (c) said instrument including a switch therein responsive to instrument contact with said tablet surface for increasing the amplitude of the signal radiated by said instrument to a second amplitude to indicate a pen down condition.

2. The combination set forth in claim 1 wherein said radiating instrument is cordless and includes an oscillator and a power supply therein for driving said oscillator to radiate said electromagnetic signal at a predetermined frequency and at a first amplitude.

3. A position resolving system for resolving the position of a radiating instrument relative to a tablet surface comprising:
    (a) a tablet having a plurality of X and Y conductors arranged orthogonally with respect to each other;
    (b) a radiating instrument for radiating an electromagnetic signal at a predetermined frequency, and at a first amplitude, from said instrument to said tablet;
    (c) said instrument including a switch therein responsive to instrument contact with said tablet surface for increasing the amplitude of the signal radiated by said instrument to a second amplitude to indicate a pen down condition;
    (d) means responsive to the amplitude of signals on said conductors for generating an address of estimated instrument position;

(e) means responsive to said pen down condition for generating a pen down status condition for a predetermined time; and (f) said means for generating an address of estimated instrument position responsive to said pen down status condition for ignoring the signals sensed on said conductors for the duration of said pen down condition.

4. The combination set forth in claim 3 wherein said radiating instrument is cordless and includes an oscillator and a power supply therein for driving said oscillator to radiate said electromagnetic signal at a predetermined frequency and at a first amplitude.

5. The combination set forth in claim 3 including means for substituting data for the ignored signals.

6. The combination set forth in claim 5 wherein said substituted data comprises an average of the data received prior to the pen down condition and data received after said predetermined time.

7. A position resolving system for resolving the position of a radiating instrument relative to a tablet surface comprising:

(a) a tablet having a plurality of X and Y conductors arranged orthogonally with respect to each other;

(b) a radiating instrument for radiating an electromagnetic signal at a predetermined frequency, and at a first amplitude, from said instrument to said tablet;

(c) said instrument including a switch therein responsive to instrument contact with said tablet surface for increasing the amplitude of the signal radiated by said instrument to a second amplitude to indicate a pen down condition;

(d) a non-coherent amplitude detection means connected to said conductors for sampling signals induced therein by said radiated electromagnetic signal;

(e) means responsive to the amplitude of signals on said conductors, detected by said non-coherent amplitude detector, for generating an instrument address;

(f) means responsive to said pen down condition for generating a pen down status condition for a predetermined time sufficient to sample selected X and Y conductors near said instrument address; and (g) said means for generating an instrument address responsive to said pen down status condition for ignoring the signals sensed on said conductors for the duration of said pen down condition.

8. The combination set forth in claim 7 including means for substituting data for the ignored signals.

9. The combination set forth in claim 8 wherein said substituted data comprises an average of the data received prior to the pen down condition and data received after said predetermined time.

10. A position resolving system for resolving the position of a radiating instrument relative to a tablet surface comprising:

(a) a tablet having a plurality of X loops and a plurality of Y loops, each loop formed by parallel spaced apart conducors interconnected by an end conductor, said X and Y loops arranged orthogonally with respect to each other;

(b) a cordless radiating instrument including an oscillator and a power supply therein for driving said oscillator to radiate an electromagnetic signal at a first amplitude, said instrument including a switch therein responsive to instrument contact with said tablet surface for increasing the amplitude of the signal radiated by said instrument to a second amplitude to indicate a pen down condition;

(c) a non-coherent amplitude detection means connected to said conductors for sampling signals induced in said loops by said radiated electromagnetic signal;

(d) means responsive to the amplitude of signals on said conductors, detected by said non-coherent amplitude detector, for generating an instrument address;

(e) means responsive to said pen down condition for generating a pen down status condition for a predetermined time sufficient to sample selected X and Y loops near said instrument address; and (f) said means for generating an instrument address responsive to said pen down condition for ignoring the signals sensed on said conductors for the duration of said pen down condition.

11. The combination set forth in claim 10 including means for substituting data for said ignored signals.

12. The combination set forth in claim 11 wherein said substituted data comprises an average of the data received prior to the pen down condition and data received after said predetermined time.

13. In a position resolving system for estimating the position of an electromagnetic radiating instrument relative to a tablet surface, the improvement comprising:

(a) a tablet having a plurality of X conductors and having a plurality of Y conductors arranged orthogonally with respect to said X conductors;

(b) a cordless radiating instrument having an oscillator therein for radiating an electromagnetic signal from a coil connected to said oscillator to said tablet;

(c) a non-coherent amplitude detection means connected to said conductors for sampling signals induced therein by said radiated electromagnetic signal; and (d) means responsive to the amplitude of signals on said conductors, above a predetermined threshold amplitude, detected by said non-coherent amplitude detector means for generating an address of said instrument position.

14. The combination set forth in claim 13 wherein said radiating instrument includes a power supply therein for driving said oscillator.

15. The combination set forth in claim 14 wherein said oscillator is a current driven oscillator for radiating an electromagnetic signal having a predetermined frequency.

16. In a position resolving system for resolving the position of a radiating instrument relative to a tablet surface, the improvement comprising:

(a) a tablet having a plurality of X loops and a plurality of Y loops, each loop formed by parallel spaced-apart conductors interconnected by an end conductor, said X and Y loops arranged orthogonally with respect to each other;

(b) a cordless radiating instrument having an oscillator therein for radiating an electromagnetic signal from said instrument to said tablet;

(c) a non-coherent amplitude detection means connected to said loops for sampling signals induced therein by said radiated electromagnetic signal; and (d) means responsive to the amplitude of signals on said conductors, above a predetermined threshold amplitude, detected by said non-coherent amplitude detector means for generating an address of said instrument position.

17. The combination set forth in claim 16 wherein said radiating instrument incorporates a power supply therein for driving said oscillator.

18. The combination set forth in claim 17 wherein said oscillator is a current driven oscillator.

19. In an apparatus for resolving the position of a radiating instrument relative to the surface of a tablet in a direction perpendicular to a plurality of parallel conductors in said tablet, the improvement comprising:
  (a) means connected to said conductors for detecting signal amplitudes on the conductors and selecting a conductor having the maximum amplitude signal thereon;
  (b) means forming a difference between the amplitude of the signal on the conductor having the maximum amplitude signal thereon and the amplitude of the signal on a conductor thrice removed from said conductor having the maximum amplitude signal thereon; and
  (c) means responsive to the polarity of said difference for selecting one of a first and a second routine for generating an address of said instrument position.

20. The apparatus of claim 19 including means for incrementing or decrementing the address of said instrument by two conductor positions when said first routine is selected and incrementing or decrementing the address of said instrument by one conductor position when said second routine is selected.

21. The combination set forth in claim 19 wherein said first routine includes the sampling of the amplitudes of signals on a first predetermined selected subset of conductors near said radiating instrument and said second routine includes sampling of the amplitudes of signals on a second and different predetermined selected subset of conductors near said radiating instrument.

22. In an apparatus for resolving the position of an electromagnetic radiating instrument relative to the surface of a tablet in a direction perpendicular to a plurality of parallel conductors in said tablet, the improvement comprising:
  (a) means connected to said conductors for non-coherently detecting signal amplitudes on the conductors and selecting a conductor having the maximum amplitude signal thereon;
  (b) means forming a difference between the amplitude of the signal on the conductor having the maximum amplitude signal thereon and the amplitude of the signal on a conductor thrice removed from said conductor having the maximum amplitude signal thereon; and
  (c) means responsive to the polarity of said difference for selecting a first or a second routine for generating an address of said instrument position.

23. The apparatus of claim 22 including means for incrementing or decrementing the address of said instrument by two conductor positions when said first routine is selected and incrementing or decrementing the address of said instrument by one conductor position when said second routine is selected.

24. The combination set forth in claim 22 wherein said first routine includes the sampling of the amplitudes of signals on a first predetermined selected subset of conductors near said radiating instrument and said second routine includes sampling of the amplitudes of signals on a second and different predetermined selected subset of conductors near said radiating instrument.

25. In an apparatus for use in a position resolving system for resolving the position of an electromagnetic radiating instrument relative to the surface of a tablet having X and Y conductors therein, the improvement comprising:
  (a) means connected to said conductors, for non-coherently detecting signal amplitudes on the conductors and selecting the X conductor and the Y conductor having the maximum amplitude signals thereon;
  (b) means forming a difference between the amplitudes of the signals on the X conductor having the maximum amplitude signal thereon and the amplitude signal on the conductor thrice removed from said X conductor with maximum amplitude signal thereon;
  (c) means responsive to the polarity of said difference for selecting a first or a second routine for resolving the X position of said instrument;
  (d) means for forming a difference between the amplitudes of signals on the Y conductor having the maximum amplitude signal thereon and the amplitude signal on the Y conductor thrice removed from said conductor with a maximum amplitude thereon; and
  (e) means responsive to the polarity of said difference for selecting one of a first and a second routine for resolving the Y position of said instrument.

26. The apparatus of claim 25 including means for incrementing or decrementing the address of the estimated position of said instrument by two conductor positions when said first routine is selected and incrementing or decrementing the estimated position of the instrument by one conductor position when said second routine is selected.

27. The apparatus of claim 25 wherein said first routine includes the sampling of the amplitude of signals on a predetermined selected subset of conductors near said instrument and said second routine includes the sampling of the amplitude of signals on a second and different predetermined selected subset of conductors near said instrument.

28. For use in a position resolving system for resolving the position of an electromagnetic radiating instrument relative to the surface of a tablet having a plurality of parallel conductors therein, the improvement comprising:
  (a) means, connected to said conductors, for non-coherently detecting signal amplitude on the conductors and selecting the conductor having the maximum signal thereon;
  (b) means responsive to said selection for forming a first difference between the amplitudes of signals on conductors next to but on opposite sides of said conductor with the maximum amplitude;
  (c) means responsive to said first difference for forming a second difference between amplitudes of signals on one of the conductors next to said conductor with a maximum amplitude thereon and a conductor twice removed from and on the opposite side of the conductor with the maximum amplitude thereon;
  (d) means responsive to said second difference for forming a third difference between the amplitude of signals on said conductor with maximum amplitude thereon and a conductor thrice removed from the conductor with the maximum amplitude thereon; and (e) means responsive to the polarity of said third difference for selecting one of a first and a second routine for generating an address of said instrument position.

29. The apparatus of claim 28 including means for incrementing or decrementing the address of the estimated position of said instrument by two conductor positions when said first routine is selected and incrementing or decrementing the estimated position of the instrument by one conductor position when said second routine is selected.

30. The apparatus set forth in claim 28 wherein said first routine includes sampling of the amplitudes of signals on a first predetermined selected subset of conductors near said radiating instrument and said second routine includes sampling of the amplitudes of signals on a second and different predetermined selected subset of conductors near said radiating instrument.

31. For use in a position resolving system for resolving the position of an electromagnetic radiating instrument relative to the surface of a tablet having a plurality of parallel conductors therein, the improvement comprising:

(a) means, connected to said conductors, for non-coherently detecting signal amplitude on the conductors and selecting the conductor having the maximum signal thereon;

(b) means responsive to said selection for forming a first difference between the amplitudes of signals on conductors next to but on opposite sides of said conductor with the maximum amplitude;

(c) means responsive to said first difference for forming a second difference between amplitudes of signals on one of the conductors next to said conductor with a maximum amplitude thereon and a conductor twice removed from and on the opposite side of the conductor with the maximum amplitude thereon;

(d) means responsive to said second difference for forming a third difference between the amplitude of signals on said conductor with maximum amplitude thereon and a conductor thrice removed from the conductor with the maximum amplitude thereon; and (e) means responsive to the sum of said second and third differences divided by the difference of said second and third differences for generating an estimated address of said instrument.

32. For use in a position resolving system for resolving the position of an electromagnetic radiating instrument relative to the surface of a tablet having a plurality of parallel conductors therein, the improvement comprising:

(a) means, connected to said conductors, for non-coherently detecting signal amplitude on the conductors and selecting the conductor having the maximum 10 signal thereon;

(b) means responsive to said selection for forming a first difference between the amplitudes of signals on conductors next to but on opposite sides of said conductor with the maximum amplitude;

(c) means responsive to said first difference for forming a second difference between amplitudes of signals on one of the conductors next to said conductor with a maximum amplitude thereon and a conductor twice removed from and on the opposite side of the conductor with the maximum amplitude thereon;

(d) means responsive to said second difference for forming a third difference between the amplitude of signals on said conductor with maximum amplitude thereon and a conductor thrice removed from the conductor with the maximum amplitude thereon;

(e) means forming a fourth difference between the amplitudes of the signals on said conductor with the maximum amplitude signal thereon and a conductor next to said conductor with the maximum amplitude; and (f) means responsive to said third difference divided by said fourth difference for generating an estimated address of said instrument.

33. In an apparatus for resolving the position of a radiating instrument relative to the surface of a tablet having conductors therein, the improvement comprising:

(a) means connected to said conductors for selecting the conductor having the signal with the maximum amplitude thereon;

(b) means responsive to the selection of said conductor for forming a first difference between the amplitude of signals on a conductor next to the conductor having the maximum amplitude signal thereon and on a conductor twice removed and on the opposite side of a conductor having the maximum amplitude signal thereon;

(c) means responsive to said selection for forming a second difference between amplitudes of signals on the conductor having the maximum amplitude signal thereon and on a conductor thrice removed therefrom and on said opposite side; and (d) means responsive to the sum of said first and second differences divided by the difference of said first and second differences for generating an estimated address of said instrument.

34. In an apparatus for resolving the position of a radiating instrument relative to the surface of a tablet having conductors therein, the improvement comprising:

(a) means connected to said conductors for selecting the conductor having the signal with the maximum amplitude thereon;

(b) means responsive to the selection of said conductor for forming a first difference between the amplitude of signals on a conductor next to and on one side of the conductor having the maximum amplitude signal thereon and on a conductor twice removed and on the opposite side of a conductor having a maximum amplitude signal thereon;

(c) means for forming a second difference between the amplitude of signals on a conductor next to but on the opposite side of the conductor having the maximum amplitude signal thereon and on a conductor twice removed and on said one side of a conductor having the maximum amplitude signal thereon; and (d) means responsive to the sum of said first and second differences divided by the difference of said first and second differences for generating an estimated address of said instrument.

35. A method for resolving the position of a signal radiating instrument relative to the surface of a tablet having a plurality of grid conductors therein, comprising:

(a) selecting the conductor having the signal with the maximum amplitude thereon;

(b) forming a difference between the amplitude of the signal on the conductor having the maximum amplitude signal thereon and the amplitude of the signal on a conductor thrice removed from said conductor having a maximum amplitude signal thereon; and (c) sensing the polarity of said difference for selecting one of a first routine and a second routine for generating an address of said instrument position.

36. A method for resolving the position of an electromagnetic radiating instrument relative to the surface of a table having X and Y orthogonally position conductors therein comprising:

(a) selecting the X conductor having the maximum amplitude signal of all X conductors;

(b) selecting the Y conductor having the maximum amplitude signal of all Y conductors;

(c) forming a difference between the amplitudes of the signals on the X conductor having the maximum amplitude signal thereon and the amplitude signal on the conductor thrice removed from said X conductor with the maximum amplitude signal thereon;

(d) forming a difference between the amplitudes of the signals on the Y conductor having the maximum amplitude signal thereon and the amplitude signal on the Y conductor thrice removed from said conductor with the maximum amplitude thereon;

(e) sensing the polarity of the difference between the signals on the X conductors for selecting one of a first and a second routine for generating an X address of said instrument position; and (f) sensing the polarity of the difference between the signals on the Y conductors for selecting one of a first and a second routine for generating an Y address of said instrument position.

37. A method for resolving the position of an electromagnetic radiating instrument relative to the surface of the tablet having a plurality of parallel conductors therein, comprising:

(a) selecting the conductor having the maximum signal thereon;

(b) forming a first difference between the amplitudes of the signals on the conductors next to but on the opposite sides of the conductor with the maximum amplitude;

(c) forming a second difference between the amplitudes of the signals on one of the conductors next to said conductor with the maximum amplitude thereon and a conductor twice removed from and on the opposite side of the conductor with the maximum amplitude thereon;

(d) forming a third difference between the amplitude of signals on said conductor with the maximum amplitude thereon and a conductor thrice removed from the conductor with the maximum amplitude thereon; and (e) sense the polarity of said third difference for selecting one of a first and a second routine for generating an address of said instrument position.

38. A method for resolving the position of a signal radiating instrument relative to the surface of the tablet having a plurality of grid conductors therein comprising:

(a) selecting the conductor having the signal with the maximum amplitude thereon;

(b) forming a first difference between the amplitude of signals on a conductor next to the conductor having the maximum amplitude signal thereon and on a conductor twice removed and on the opposite side of a conductor having the maximum amplitude signal thereon;

(c) forming a second difference between the amplitudes of signals on the conductor having the maximum amplitude signal thereon and on a conductor thrice removed therefrom and on said opposite side;

(d) forming the sum of said first and second differences;

(e) forming a difference of said first and second differences;

(f) dividing said sum by the difference of said differences for generating an estimated address of said instrument.

* * * * *